United States Patent
Wariishi et al.

(10) Patent No.: US 7,306,873 B2
(45) Date of Patent: Dec. 11, 2007

(54) METHOD AND APPARATUS FOR CHANGING THE DIRECTION OF FLUID FLOW IN FUEL CELL FLOW FIELDS

(75) Inventors: Yoshinori Wariishi, Utsunomiya (JP);
Naoyuki Enjoji, Utsunomiya (JP);
Masaharu Suzuki, Utsunomiya (JP);
Yuichiro Kosaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 550 days.

(21) Appl. No.: 10/641,814

(22) Filed: Aug. 15, 2003

(65) Prior Publication Data

US 2004/0038114 A1     Feb. 26, 2004

(30) Foreign Application Priority Data

Aug. 21, 2002  (JP)  ............................. 2002-240930

(51) Int. Cl.
*H01M 8/04*     (2006.01)
*H01M 8/24*     (2006.01)

(52) U.S. Cl. .......................................... 429/38; 429/26

(58) Field of Classification Search ................. 429/26, 429/38
See application file for complete search history.

(56) References Cited

U.S. PATENT DOCUMENTS

| | | | |
|---|---|---|---|
| 5,288,562 A * | 2/1994 | Taniguchi et al. ............. 429/32 |
| 5,527,363 A * | 6/1996 | Wilkinson et al. ......... 29/623.1 |
| 5,527,634 A * | 6/1996 | Meacham ..................... 429/35 |
| 5,935,726 A | 8/1999 | Chow et al. ................. 429/13 |
| 6,277,511 B1 | 8/2001 | Iwase et al. |
| 6,322,914 B1 * | 11/2001 | Chow et al. ................. 429/13 |
| 6,964,824 B2 * | 11/2005 | Enjoji et al. ................. 429/34 |
| 2003/0082433 A1 | 5/2003 | Sano et al. ................... 429/39 |

FOREIGN PATENT DOCUMENTS

| | | |
|---|---|---|
| JP | 11-283639 | 10/1999 |
| JP | 2000-030730 A | 1/2000 |
| JP | 2002141086 A | 5/2002 |

\* cited by examiner

*Primary Examiner*—Gregg Cantelmo
(74) *Attorney, Agent, or Firm*—Lahive & Cockfield, LLP; Anthony A. Laurentano, Esq.

(57) ABSTRACT

A fuel cell includes an electrolyte electrode assembly and a pair of first and second separators. First through fourth oxygen-containing gas holes, first through fourth coolant holes, and first through fourth fuel gas holes extend through the fuel cell. The first through fourth oxygen-containing gas holes are selectively used as oxygen-containing gas supply ports or oxygen-containing gas discharge ports to change the flow direction of an oxygen-containing gas in an oxygen-containing gas flow field continuously.

8 Claims, 26 Drawing Sheets

METHOD AND APPARATUS FOR CHANGING THE DIRECTION OF FLUID FLOW IN FUEL CELL FLOW FIELDS

BACKGROUND OF THE INVENTION

1. Field of the Invention

The present invention relates to a fuel cell including an electrolyte electrode assembly and a pair of separators for sandwiching the electrolyte electrode assembly. The electrolyte electrode assembly includes electrodes and an electrolyte interposed between the electrodes. Further, the present invention relate to a method of operating the fuel cell.

2. Description of the Related Art

For example, a solid polymer electrolyte fuel cell employs a membrane electrode assembly (electrolyte electrode assembly) which comprises two electrodes (anode and cathode) and an electrolyte membrane interposed between the electrodes. The electrolyte membrane is a polymer ion exchange membrane (proton exchange membrane). The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current. An oxygen-containing gas or air is supplied to the cathode. At the cathode, the hydrogen ions from the anode combine with the electrons and oxygen to produce water.

The fuel cell has a fuel gas flow field (fluid flow field) defined in each separator for passing the fuel gas therethrough to the anode and an oxygen-containing gas flow field (fluid flow field) defined in each separator for passing the oxygen-containing gas therethrough to the cathode. If necessary, a coolant flow field for passing a coolant therethrough is defined between the separators along the surfaces of the separators.

The electrolyte membrane is required to be appropriately humidified to keep a desired ion conductivity and reduce any structural damage which would otherwise be caused to the electrolyte membrane if it were unduly dried. However, since the reactant gases that are supplied to the fuel cell have low humidity, the electrolyte membrane tends to be dried at inlets of the reactant gas flow fields.

When the fuel cell generates electric energy, i.e., the reactant gases react with each other, the fuel cell produces water. Because the produced water is liable to stay at outlets of the reactant gas flow fields, the electrolyte membrane tends to be excessively humidified, i.e., tends to suffer flooding, at the outlets of the reactant gas flow fields. The flooding possibly causes an insufficient supply of reactant gases to the surfaces of the electrodes.

In an attempt to address the problem, U.S. Pat. No. 5,935,726 (prior art 1) discloses a method of and an apparatus for distributing water to an ion exchange membrane in a fuel cell. According to prior art 1, the direction in which an oxygen-containing gas flows through an oxygen-containing gas flow field is periodically reversed to prevent excessive drying of an electrolyte membrane in the vicinity of a gas inlet and also to prevent flooding in the vicinity of a gas outlet for thereby uniformizing a distribution of water in the fuel cell.

According to prior art 1, however, since a switching mechanism (solenoid-operated directional control valve or the like) is used to change the direction of the flow of the oxygen-containing gas, the flow of the oxygen-containing gas occasionally stops in the oxygen-containing gas flow field. Because of such occasions, the supply of the oxygen-containing gas becomes unstable, making it impossible for the fuel cell to keep a stable output of electric energy.

Japanese laid-open patent publication No. 2002-141086 (prior art 2) discloses a fuel cell in which the flow direction of an oxygen-containing gas can be switched according to the operating condition of the fuel cell. The oxygen-containing gas flows in the direction of anti-gravity in dry condition, and flows in the direction of gravity in wet condition. The amount of water produced in the reactions of the fuel cell is controlled by switching the flow direction of the oxygen-containing gas for preventing the dry up and flooding in the fuel cell.

According to prior art 2, however, the overall fuel cell needs to be reversed using a motor. Therefore, the fuel cell system is considerably complicated, and large.

SUMMARY OF THE INVENTION

It is a major object of the present invention to provide a fuel cell which is capable of continuously changing the flow direction of a fluid flowing along a surface of an electrode for keeping the electrode surface in a uniform state and of producing a high stable output of electric energy.

According to the present invention, when a fluid, which comprises at least one of an oxygen-containing gas, a fuel gas, and a coolant is supplied to and discharged from fluid holes extending through a fuel cell, the fluid flows along a surface of an electrode in a fluid flow field connected to the fluid holes. Then, a predetermined fluid hole is selected from the fluid holes, and the selected fluid hole is used as a fluid supply port or a fluid discharge port to change the flow direction of the fluid in the fluid flow field continuously.

When the flow direction of the fluid is changed, the flow of the fluid is not stopped. Therefore, the fuel cell can reliably produce a stable output. It is possible to uniformize the distribution of current densities, the distribution of produced water, the distribution of humidities, and the distribution of temperatures on the electrode surfaces. Thus, the characteristics of the fuel cell to generate electric energy are improved. The power generation is uniformly performed over the entire electrode surfaces, and the entire electrode surfaces are uniformly utilized. Consequently, the durability of the electrolyte electrode assembly is effectively improved.

Each of the fluid holes is used as the fluid discharge port, used as the fluid supply port, or not used as a fluid port by switching operation of the switching mechanism, and at least one fluid hole is used as the fluid supply port and at least one fluid hole is used as the fluid discharge port. The flow direction in the fluid flow field is changed continuously. Therefore, the reactant gasses such as the oxygen-containing gas and the fuel gas, and the coolant are uniformly distributed in the surfaces of the electrodes.

The fuel cell may further include an inner hole in the electrodes. The inner hole is used as the fluid supply port or the fluid discharge port. The surfaces of the electrodes are thus kept in a uniform state for increased fuel cell performance.

The fluid flow field is defined by an embossed structure on the separator. The embossed structure allows the fluid to flow in directions that can be changed smoothly and reliably.

The embossed structure includes guide ribs. The guide ribs allow the fluid to flow uniformly in the electrode surface when the fluid flow is changed in the fluid flow field.

The fuel cell may include a fuel gas flow field and an oxygen-containing gas flow field for being supplied with a fuel gas and an oxygen-containing gas, respectively, which flow as substantial counterflows, respectively, through the fuel gas flow field and the oxygen-containing gas flow field. Consequently, water moves optimally between the fuel gas flow field and the oxygen-containing gas flow field across the electrolyte electrode assembly, allowing the fuel cell to operate with the supply of reactant gases having low or no humidity.

The fuel cell may further include a coolant flow field for being supplied with a coolant flowing substantially parallel to the oxygen-containing gas through the coolant flow field. While the downstream side of the oxygen-containing gas flow field is made highly humid, it has a high temperature which lowers the relative humidity thereof, thus effectively preventing water condensation on the downstream side of the oxygen-containing gas flow field.

The electrolyte electrode assembly and the separators may be stacked vertically. The vertical stack is effective to prevent condensed water from staying or remaining stagnant downstream as in a structure where the stack lies horizontally, and allows condensed water to move smoothly and be discharged well.

Switching operation from a first fluid hole to a second fluid hole is performed by starting the fluid flow in the second fluid hole while keeping the fluid flow in the first fluid hole, and then, finishing the fluid flow in the first fluid hole. Therefore, the flow of the fluid is not stopped, so that the fuel cell can reliably produce a stable output.

The interval of time for performing switching operation of the fluid holes is shorter when the fuel cell produces a high output than when the fuel cell produces a low output. The surfaces of the electrodes are thus kept in a uniform state.

The numbers of fluid supply ports and fluid discharge ports which are simultaneously used are greater when the fuel cell produces a high output than when the fuel cell produces a low output. Thus, the pressure loss in the fluid holes is reduced, and the fluid distribution is performed desirably.

The interval of time at which the supply and discharge of the fluid to and from the fluid holes is switched is changed depending on a load on the fuel cell, or the numbers of fluid supply ports and fluid discharge ports which are simultaneously used are changed depending on a load on the fuel cell. It is thus possible to maintain an optimum distribution of the fluid the surfaces of the electrodes for changing the output of the fuel cell.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
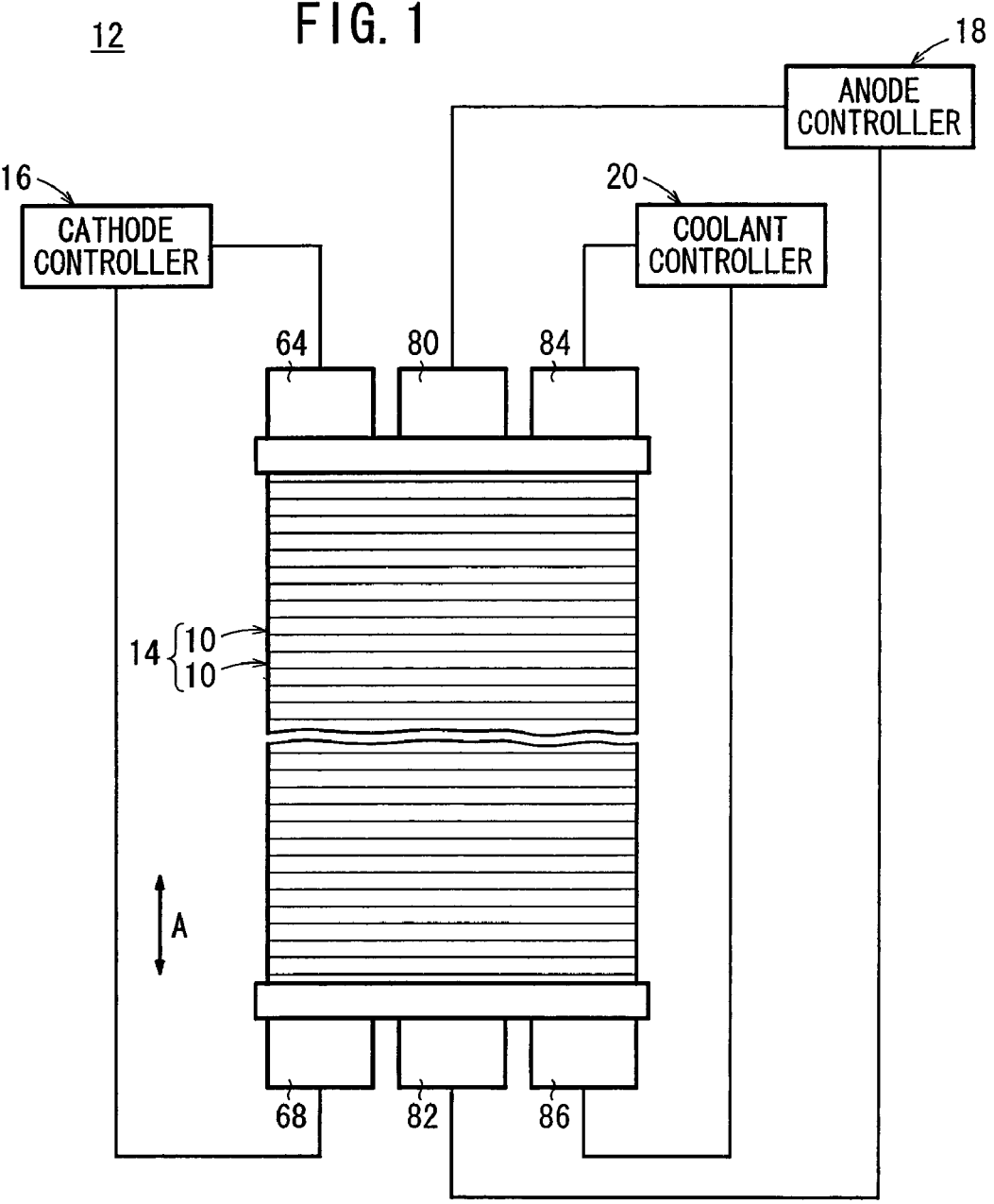
FIG. 1 is a schematic view, partly in block form, of a fuel cell system incorporating a fuel cell according to a first embodiment of the present invention.

FIG. 1 schematically shows, partly in block form, of a fuel cell system 12 incorporating a fuel cell 10 according to a first embodiment of the present invention.

As shown in FIG. 1, the fuel cell system 12 includes a plurality of fuel cells 10 which are stacked vertically in the direction indicated by the arrow A, into a fuel cell stack 14. The fuel cell stack 14 is connected to a cathode controller 16 for supplying and discharging an oxygen-containing gas such as air, an anode controller 18 for supplying and discharging a fuel gas such as a hydrogen-containing gas, and a coolant controller 20 for supplying and discharging a coolant such as pure water, ethylene glycol, oil.

Figure 2:
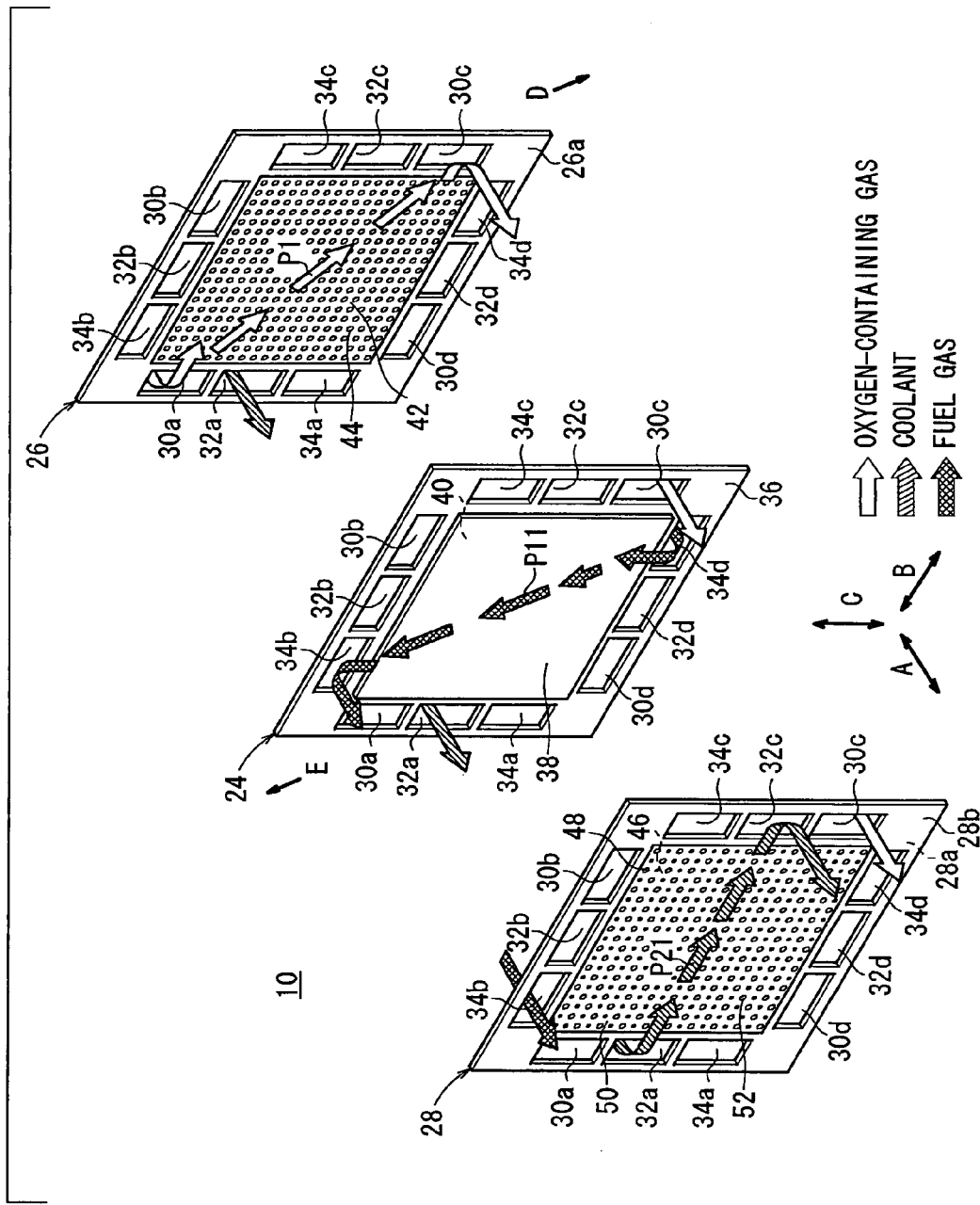
FIG. 2 is an exploded perspective view showing main components of the fuel cell.

As shown in FIG. 2, each of the fuel cells 10 comprises a substantially square-shaped membrane electrode assembly (electrolyte electrode assembly) 24, and substantially square-shaped first and second separators 26, 28 of metal which sandwich the membrane electrode assembly 24 therebetween. Seals (not shown) are interposed between the membrane electrode assembly 24 and the first and second separators 26, 28 to cover the outer peripheral edges of fluid holes and electrode surfaces, which will be described later on.

The fuel cell 10 has, defined in one end thereof in the direction indicated by the arrow B, a first oxygen-containing gas hole 30a for passing the oxygen-containing gas therethrough, a first coolant hole 32a for passing the coolant therethrough, and a first fuel gas hole 34a for passing the fuel gas therethrough. The first oxygen-containing gas hole 30a, the first coolant hole 32a, and the first fuel gas hole 34a extend through the membrane electrode assembly 24 and the first and second separators 26, 28 in the direction indicated by the arrow A, and are arranged in the direction indicated by the arrow C.

The fuel cell 10 also has, defined in one end thereof in the direction indicated by the arrow C, a second fuel gas hole 34b, a second coolant hole 32b, and a second oxygen-containing gas hole 30b which extend through the membrane electrode assembly 24 and the first and second separators 26, 28 in the direction indicated by the arrow A, and are arranged in the direction indicated by the arrow B.

The fuel cell 10 also has, defined in the opposite end thereof in the direction indicated by the arrow B, a third oxygen-containing gas hole 30c, a third coolant hole 32c, and a third fuel gas hole 34c which extend through the membrane electrode assembly 24 and the first and second separators 26, 28 in the direction indicated by the arrow A, and are arranged in the direction indicated by the arrow C. The fuel cell 10 also has, defined in the opposite end thereof in the direction indicated by the arrow C, a fourth oxygen-containing gas hole 30d, a fourth coolant hole 32d, and a fourth fuel gas hole 34d which extend through the membrane electrode assembly 24 and the first and second separators 26, 28 in the direction indicated by the arrow A, and are arranged in the direction indicated by the arrow B.

Figure 3:
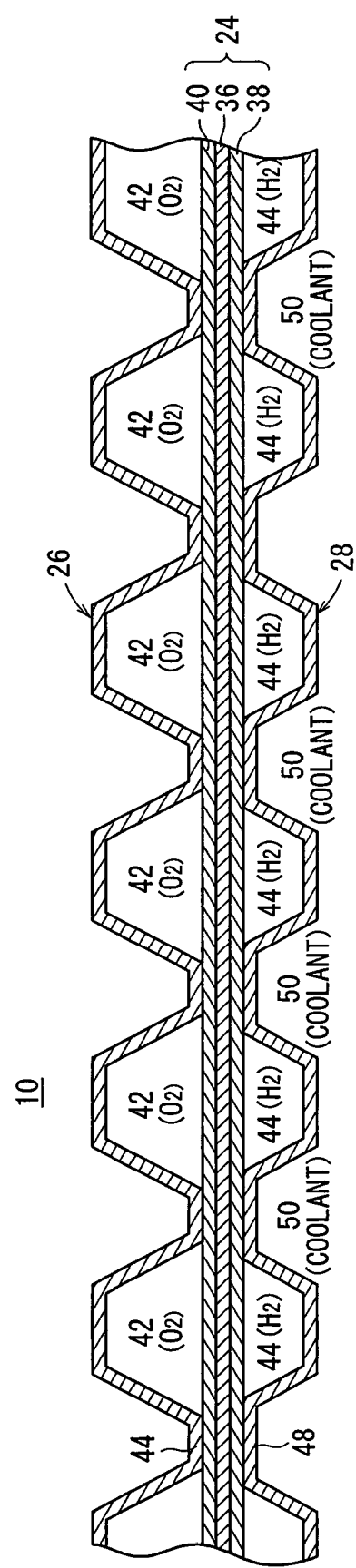
FIG. 3 is a cross-sectional view showing main components of the fuel cell.

As shown in FIGS. 2 and 3, the membrane electrode assembly 24 comprises an anode 38, a cathode 40, and an ion exchange membrane 36 of a solid electrolyte interposed between the anode 38 and the cathode 40. The ion exchange membrane 36 is formed by impregnating a thin membrane of perfluorosulfonic acid with water, for example. Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the ion exchange membrane 36, respectively.

The first separator 26 has, on its surface 26a facing the cathode 40, an oxygen-containing gas flow field (fluid flow field) 42 which is connectable to the first through fourth oxygen-containing gas holes 30a, 30b, 30c, 30d. The oxygen-containing gas flow field 42 is defined by a plurality of bosses (embossed structure) 44.

Figure 4:
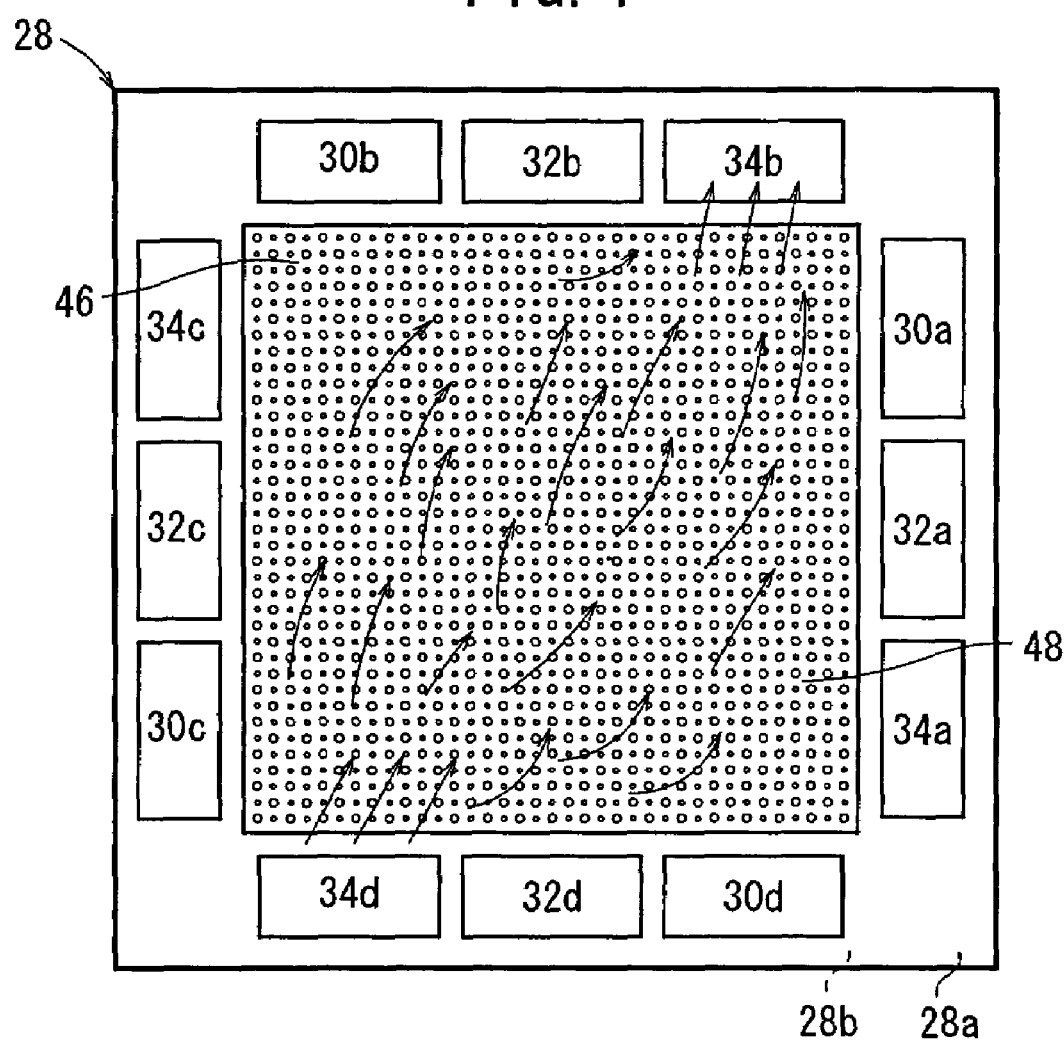
FIG. 4 is a front view of a second separator of the fuel cell.

As shown in FIGS. 2 and 4, the second separator 28 has, on its surface 28a facing the anode 38, a fuel gas flow field (fluid flow field) 46 which is connectable to the first through fourth fuel gas holes 34a, 34b, 34c, 34d. The fuel gas flow field 46 is defined by a plurality of bosses (embossed structure) 48.

As shown in FIG. 2, the second separator 28 has, on its surface 28b opposite to the surface 28a, a coolant flow field (fluid flow field) 50 which is defined by a plurality of bosses (embossed structure) 52 that are smaller in diameter than the bosses 48.

Figure 5:
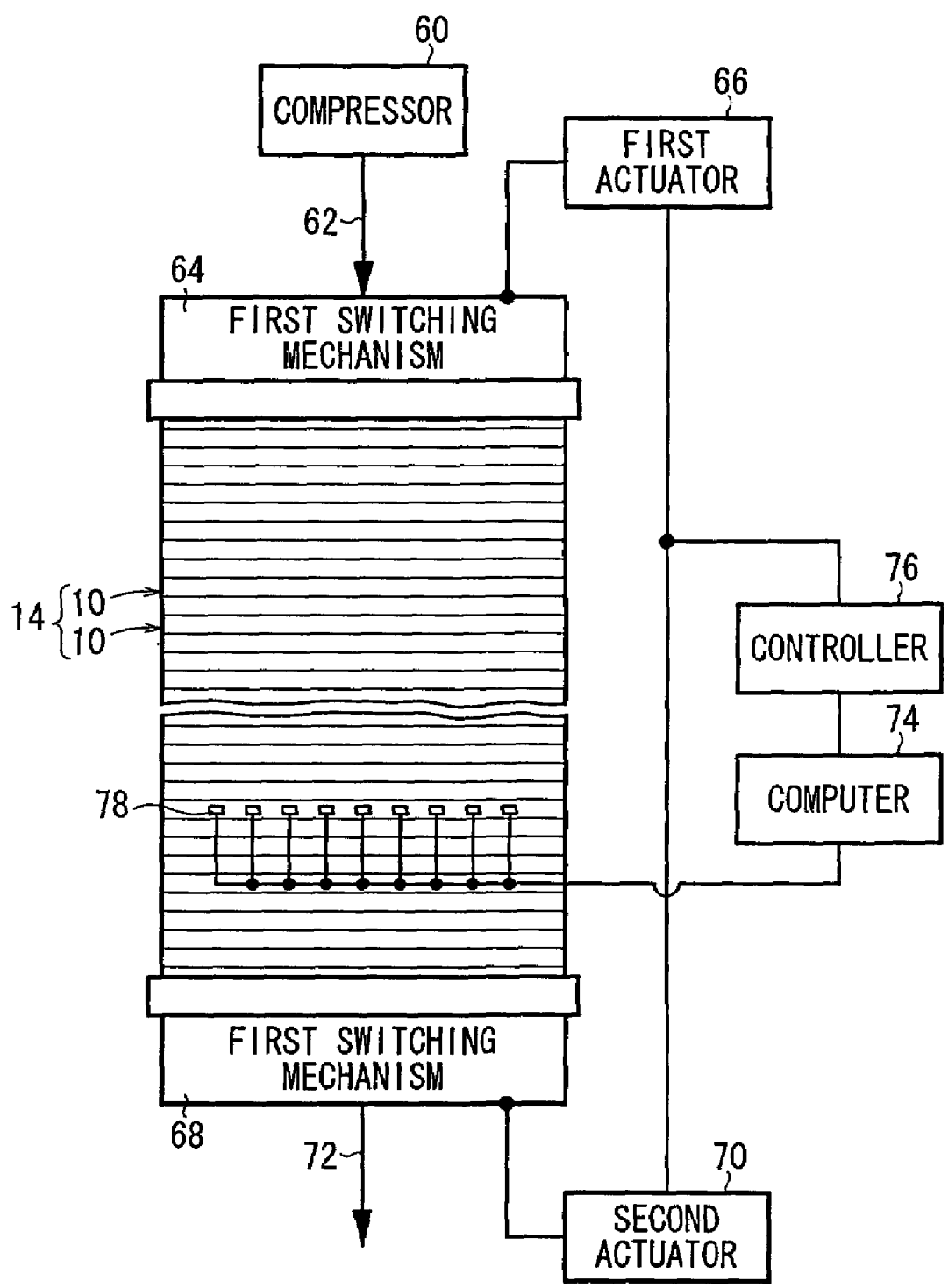
FIG. 5 is a view showing a cathode controller of the fuel cell system.

As shown in FIG. 5, the cathode controller 16 has a compressor 60 for supplying air, for example, as the oxygen-containing gas. The compressor 60 is connected to a first switching mechanism 64 by a supply pipe 62. For example, the first switching mechanism 64 comprises a rotary switching mechanism, and is mounted on a supply side of the fuel cell stack 14 for performing switching operations using a first actuator 66.

The first actuator 66 may be operated mechanically, electrically, electromagnetically, pneumatically, or hydraulically. The first switching mechanism 64 uses the first actuator 66 to perform switching operations for connecting the supply pipe 62 selectively to the first through fourth oxygen-containing gas holes 30a, 30b, 30c, 30d.

Specifically, the first switching mechanism 64 operates to switch the supply pipe 62 selectively into a position for connection to only the first oxygen-containing gas hole 30a, a position for connection to both of the first and second oxygen-containing gas holes 30a, 30b, a position for connection to only the second oxygen-containing gas hole 30b, a position for connection to both of the second and third oxygen-containing gas holes 30b, 30c, a position for connection to only the third oxygen-containing gas hole 30c, a position for connection to both of the third and fourth oxygen-containing gas holes 30c, 30d, and a position for connection to only the fourth oxygen-containing gas hole 30d.

The first switching mechanism 64 may alternatively comprise a solenoid-operated directional control valve (not shown) for connecting the supply pipe 62 selectively to the first through fourth oxygen-containing gas holes 30a, 30b, 30c, 30d.

A second switching mechanism 68 is operatively mounted on a discharge side of the fuel cell stack 14 thorough a second actuator 70 for selectively connecting the first through fourth oxygen-containing gas holes 30a, 30b, 30c, 30d to a discharge pipe 72.

The first and second actuators 66, 70 are operated under a control of a controller 76 using a computer 74. A detection signal from sensors 78 attached to the fuel cell stack 14 is inputted to the computer 74. As the sensors 78, temperature sensors, humidity sensors for the oxygen-containing gas such as air may be attached to the discharge side or the supply side of the fuel cell stack 14. Alternatively, water level sensors or current density sensors may be provided in the electrode surfaces. Instead of using the sensors 78, the switching operations may be performed periodically using a timer, for example.

Figure 6:
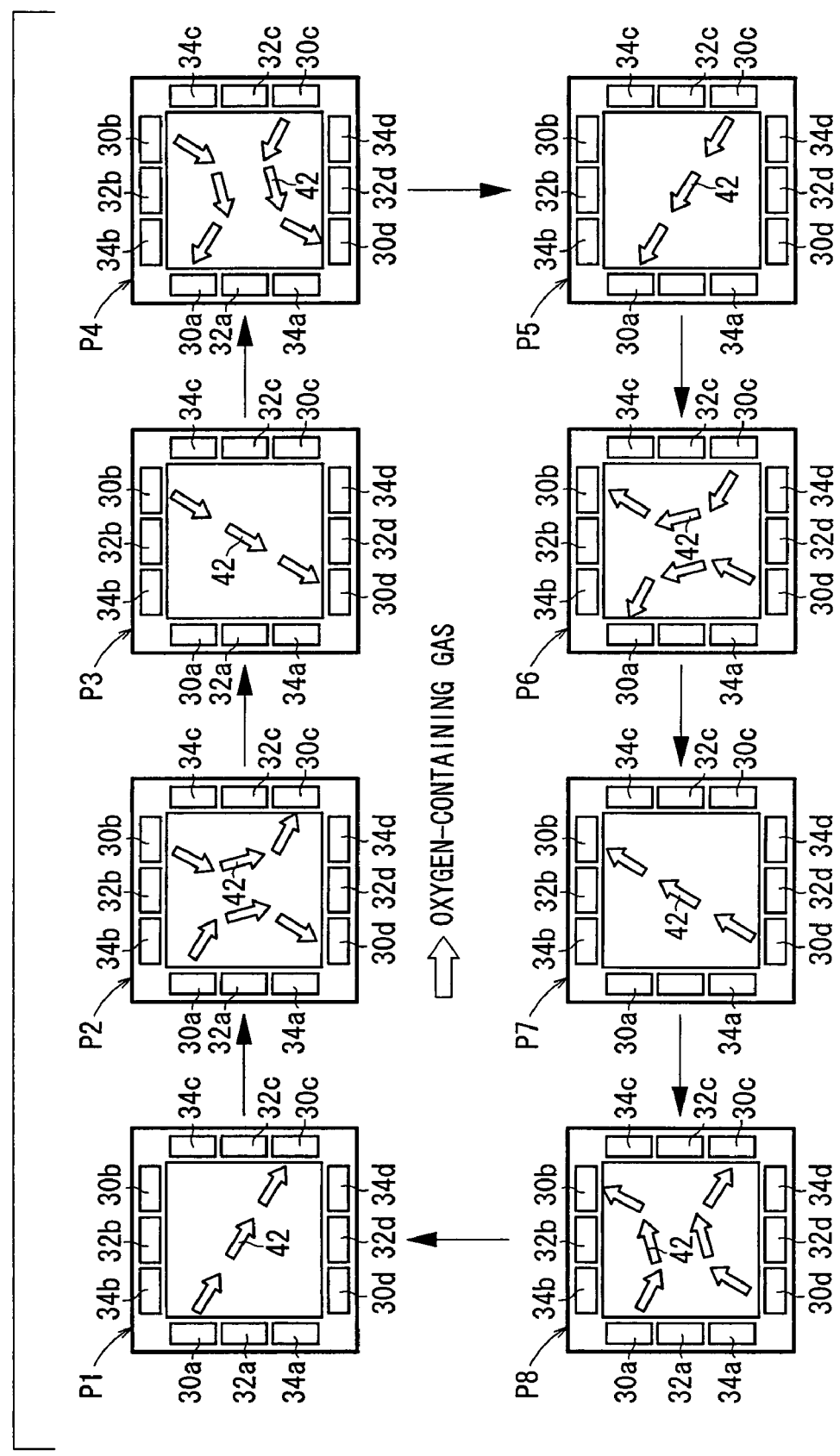
FIG. 6 is a view illustrative of the manner in which the direction of a flow in an oxygen-containing gas flow field is changed.

The first switching mechanism 64 and the second switching mechanism 68 are actuated to selectively use the first through fourth oxygen-containing gas holes 30*a*, 30*b*, 30*c*, 30*d* as an oxygen-containing gas supply port (fluid supply port) and/or an oxygen-containing gas discharge port (fluid discharge port). Specifically, as shown in FIG. 6, the first and second switching mechanisms 64, 68 selectively use the first through fourth oxygen-containing gas holes 30*a*, 30*b*, 30*c*, 30*d* successively in first through eighth positions P1 through P8 according to a pattern shown in FIG. 7.

In the first position P1, the oxygen-containing gas is supplied through only the first oxygen-containing gas hole 30*a* as the oxygen-containing gas supply port and the oxygen-containing gas is discharged through only the third oxygen-containing gas hole 30*c* as the oxygen-containing gas discharge port. In the second position P2, the oxygen-containing gas is supplied through the first and second oxygen-containing gas holes 30*a*, 30*b* as the oxygen-containing gas supply ports and the oxygen-containing gas is discharged through the third and fourth oxygen-containing gas holes 30*c*, 30*d* as the oxygen-containing gas discharge ports.

In the third position P3, the oxygen-containing gas is supplied through only the second oxygen-containing gas hole 30*b* as the oxygen-containing gas supply port and the oxygen-containing gas is discharged through only the fourth oxygen-containing gas hole 30*d* as the oxygen-containing gas discharge port. In the fourth position P4, the oxygen-containing gas is supplied through the second and third oxygen-containing gas holes 30*b*, 30*c* as the oxygen-containing gas supply ports and the oxygen-containing gas is discharged through the fourth and first oxygen-containing gas holes 30*d*, 30*a* as the oxygen-containing gas discharge ports.

In the fifth position P5, the oxygen-containing gas is supplied through only the third oxygen-containing gas hole 30*c* as the oxygen-containing gas supply port and the oxygen-containing gas is discharged through only the first oxygen-containing gas hole 30*a* as the oxygen-containing gas discharge port. In the sixth position P6, the oxygen-containing gas is supplied through the third and fourth oxygen-containing gas holes 30*c*, 30*d* as the oxygen-containing gas supply ports and the oxygen-containing gas is discharged through the first and second oxygen-containing gas holes 30*a*, 30*b* as the oxygen-containing gas discharge ports.

In the seventh position P7, the oxygen-containing gas is supplied through only the fourth oxygen-containing gas hole 30*d* as the oxygen-containing gas supply port and the oxygen-containing gas is discharged through only the second oxygen-containing gas hole 30*b* as the oxygen-containing gas discharge port. In the eighth position P8, the oxygen-containing gas is supplied through the fourth and first oxygen-containing gas holes 30*d*, 30*a* as the oxygen-containing gas supply ports and the oxygen-containing gas is discharged through the second and third oxygen-containing gas holes 30*b*, 30*c* as the oxygen-containing gas discharge ports.

Figure 8:
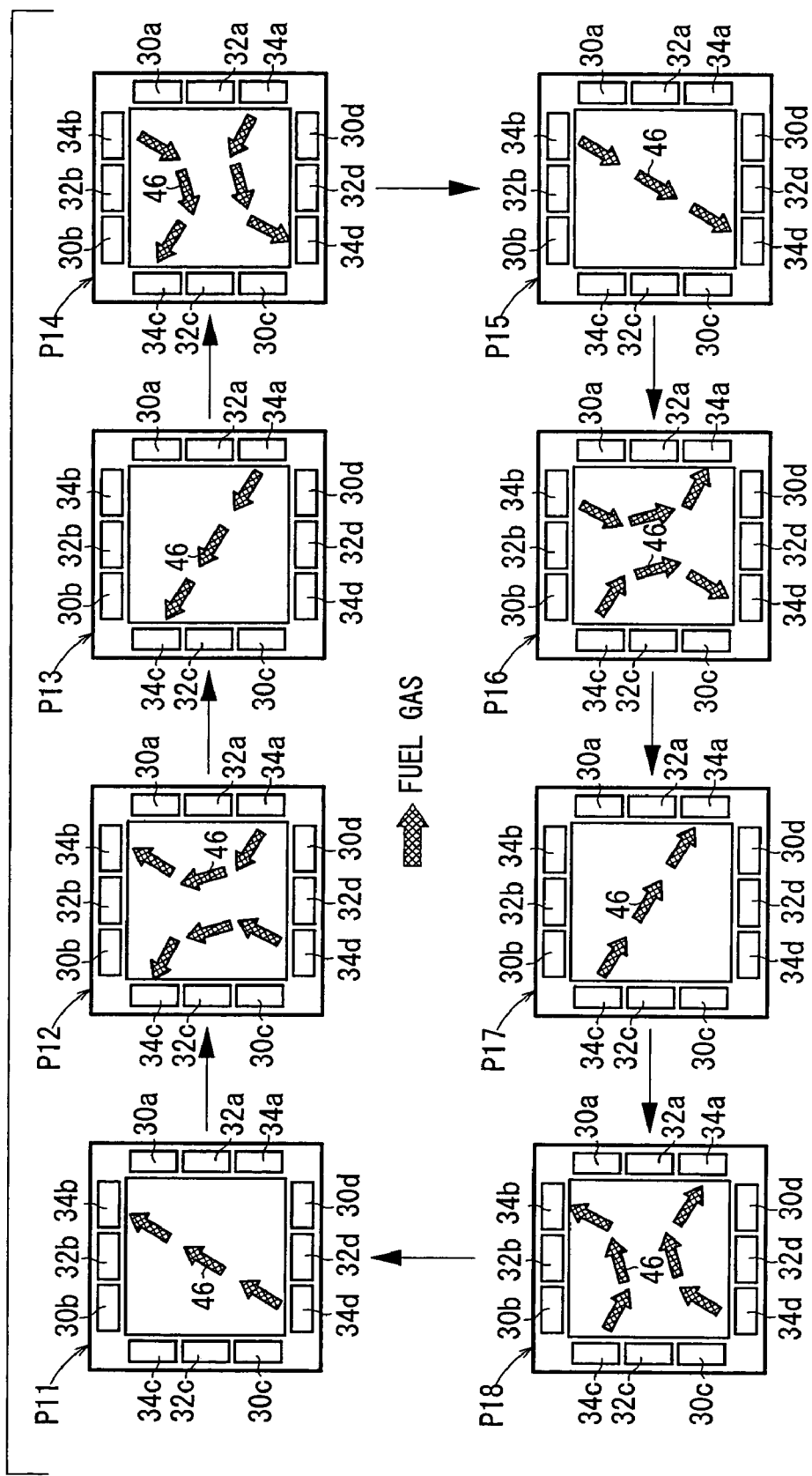
FIG. 8 is a view illustrative of the manner in which the direction of a flow in a fuel gas flow field is changed.

As shown in FIG. 1, the anode controller 18 is constructed similarly to the cathode controller 16, and is connected to a first switching mechanism 80 which is coupled to a fuel gas tank, not shown, and mounted on the supply side of the fuel cell stack 14, and a second switching mechanism 82 mounted on the discharge side of the fuel cell stack 14. The first and second switching mechanisms 80, 82 selectively use the first through fourth fuel gas holes 34*a*, 34*b*, 34*c*, 34*d* successively in first through eighth positions P11 through P18 as shown in FIG. 8.

In the first position P11, the fuel gas is supplied through only the fourth fuel gas hole 34*d* as a fuel gas supply port (fluid supply port) and the fuel gas is discharged through only the second fuel gas hole 34*b* as a fuel gas discharge port (fluid discharge port). In the second position P12, the fuel gas is supplied through the fourth and first fuel gas holes 34*d*, 34*a* as the fuel gas supply ports and the fuel gas is discharged through the second and third fuel gas holes 34*b*, 34*c* as the fuel gas discharge ports.

In the third position P13, the fuel gas is supplied through only the first fuel gas hole 34*a* as the fuel gas supply port and the fuel gas is discharged through only the second fuel gas hole 34*c* as the fuel gas discharge port. In the fourth position P14, the fuel gas is supplied through the first and second fuel gas holes 34*a*, 34*b* as the fuel gas supply ports and the fuel gas is discharged through the third and fourth fuel gas holes 34*c*, 34*d* as the fuel gas discharge ports.

In the fifth position P15, the fuel gas is supplied through only the second fuel gas hole 34*b* as the fuel gas supply port and the fuel gas is discharged through only the fourth fuel gas hole 34*d* as the fuel gas discharge port. In the sixth position P16, the fuel gas is supplied through the second and third fuel gas holes 34*b*, 34*c* as the fuel gas supply ports and the fuel gas is supplied through the fourth and first fuel gas holes 34*d*, 34*a* as the fuel gas discharge ports.

In the seventh position P17, the fuel gas is supplied through only the third fuel gas hole 34*c* as the fuel gas supply port and the fuel gas is discharged through only the first fuel gas hole 34*a* as the fuel gas discharge port. In the eighth position P18, the fuel gas is supplied through the third and fourth fuel gas holes 34*c*, 34*d* as the fuel gas supply ports and the fuel gas is discharged through the first and second fuel gas holes 34*a*, 34*b* as the fuel gas discharge ports.

Figure 9:
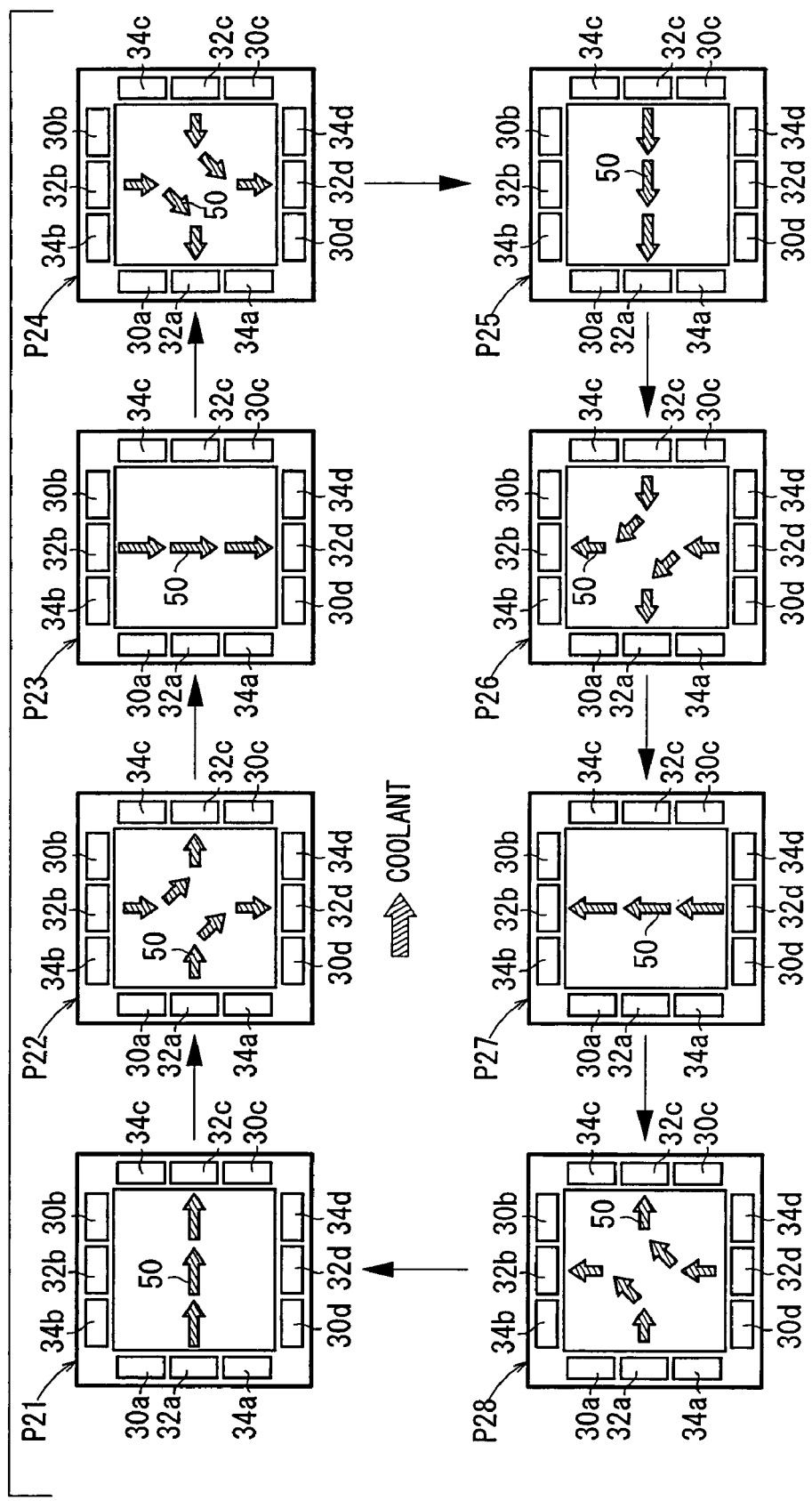
FIG. 9 is a view illustrative of the manner in which the direction of a flow in a coolant flow field is changed.

As shown in FIG. 1, the coolant controller 20 is constructed similarly to the cathode controller 16 and the anode controller 18, and is connected to a first switching mechanism 84 which is coupled to a coolant tank, not shown, and mounted on the supply side of the fuel cell stack 14, and a second switching mechanism 86 mounted on the discharge side of the fuel cell stack 14. The first and second switching mechanisms 84, 86 selectively use the first through fourth coolant holes 32*a*, 32*b*, 32*c*, 32*d* successively in first through eighth positions P21 through P28 as shown in FIG. 9.

In the first position P21, the coolant is supplied through only the first coolant hole 32*a* as a coolant supply port.(fluid supply port) and the coolant is discharged through only the third coolant hole 32*c* as a coolant discharge port (fluid discharge port). In the second position P22, the coolant is supplied through the first and second coolant holes 32*a*, 32*b* as the coolant supply ports and the coolant is discharged through the third and fourth coolant holes 32*c*, 32*d* as the coolant discharge ports.

In the third position P23, the coolant is supplied through only the second coolant hole 32*b* as the coolant supply port and the coolant is discharged through only the fourth coolant hole 32*d* as the coolant discharge port. In the fourth position P24, the coolant is supplied through the second and third coolant holes 32*b*, 32*c* as the coolant supply ports and the coolant is discharged through the fourth and first coolant holes 32*d*, 32*a* as the coolant discharge ports.

In the fifth position P25, the coolant is supplied through only the third coolant hole 32*c* as the coolant supply port and the coolant is discharged through only the first coolant hole 32a as the coolant discharge port. In the sixth position P26, the coolant is supplied through the third and fourth coolant holes 32c, 32d as the coolant supply ports and the coolant is discharged through the first and second coolant holes 32a, 32b as the coolant discharge ports.

In the seventh position P27, the coolant is supplied through only the fourth coolant hole 32d as the coolant supply port and the coolant is discharged through only the second coolant hole 32b as the coolant discharge port. In the eighth position P28, the coolant is supplied through the fourth and first coolant holes 32d, 32a as the coolant supply ports and the coolant is discharged through the second and third coolant holes 32b, 32c as the coolant discharge ports.

Operation of the fuel cell system 12 with respect to a method of operating the fuel cell 10 according to the first embodiment of the present invention will be described below.

As shown in FIG. 2, the first through fourth oxygen-containing gas holes 30a, 30b, 30c, 30d are in the first position P1, the first through fourth fuel gas holes 34a, 34b, 34c, 34d are in the first position P11, and the first through fourth coolant holes 32a, 32b, 32c, 32d are in the first position P21.

The fuel cell 10 is supplied with an oxygen-containing gas such as air, a fuel gas such as a hydrogen-containing gas, and a coolant such as pure water, ethylene glycol, oil. The oxygen-containing gas is supplied to the first fuel gas hole 34a extending through the fuel cell 10 in the direction indicated by the arrow A, and introduced into the oxygen-containing gas flow field 42 of the first separator 26.

In the oxygen-containing gas flow field 42, the oxygen-containing gas flows toward the third oxygen-containing gas hole 30c along the bosses 44 in the direction indicated by the arrow D, and flows along the cathode 40 of the membrane electrode assembly 24.

As shown in FIGS. 2 and 4, the fuel gas is supplied to the fourth fuel gas hole 34d which extends through the fuel cell 10 in the direction indicated by the arrow A, and introduced into the fuel gas flow field 46 of the second separator 28. In the fuel gas flow field 46, the fuel gas flows through the bosses 48 along the anode 38 of the membrane electrode assembly 24.

In the membrane electrode assembly 24, therefore, the oxygen-containing gas supplied to the cathode 40 and the fuel gas supplied to the anode 38 are consumed by an electrochemical reaction in the electrode catalyst layer, generating electric energy (see FIG. 3).

Then, the oxygen-containing gas supplied to and consumed on the cathode 40 is discharged into the third oxygen-containing gas hole 30c (see FIGS. 2 and 6). Similarly, the fuel gas supplied to and consumed on the anode 38 is discharged into the second fuel gas hole 34b (see FIGS. 2 and 8).

The coolant is supplied to the first coolant hole 32a and introduced into the coolant flow field 50 of the second separator 28. The coolant flows along the bosses 52 in the direction indicated b the arrow B. cools the membrane electrode assembly 24, and thereafter is discharged into the third coolant hole 32c (see FIGS. 2 and 9).

In the first embodiment, the cathode controller 16, the anode controller 18, and the coolant controller 20 are synchronously operated to control the first switching mechanisms 64, 80, 84 and the second switching mechanisms 68, 82, 86 to selectively connect the first through fourth oxygen-containing gas holes 30a, 30b, 30c, 30d, the first through fourth fuel gas holes 34a, 34b, 34c, 34d, and the first through fourth coolant holes 32a, 32b, 32c, 32d.

Figure 7:
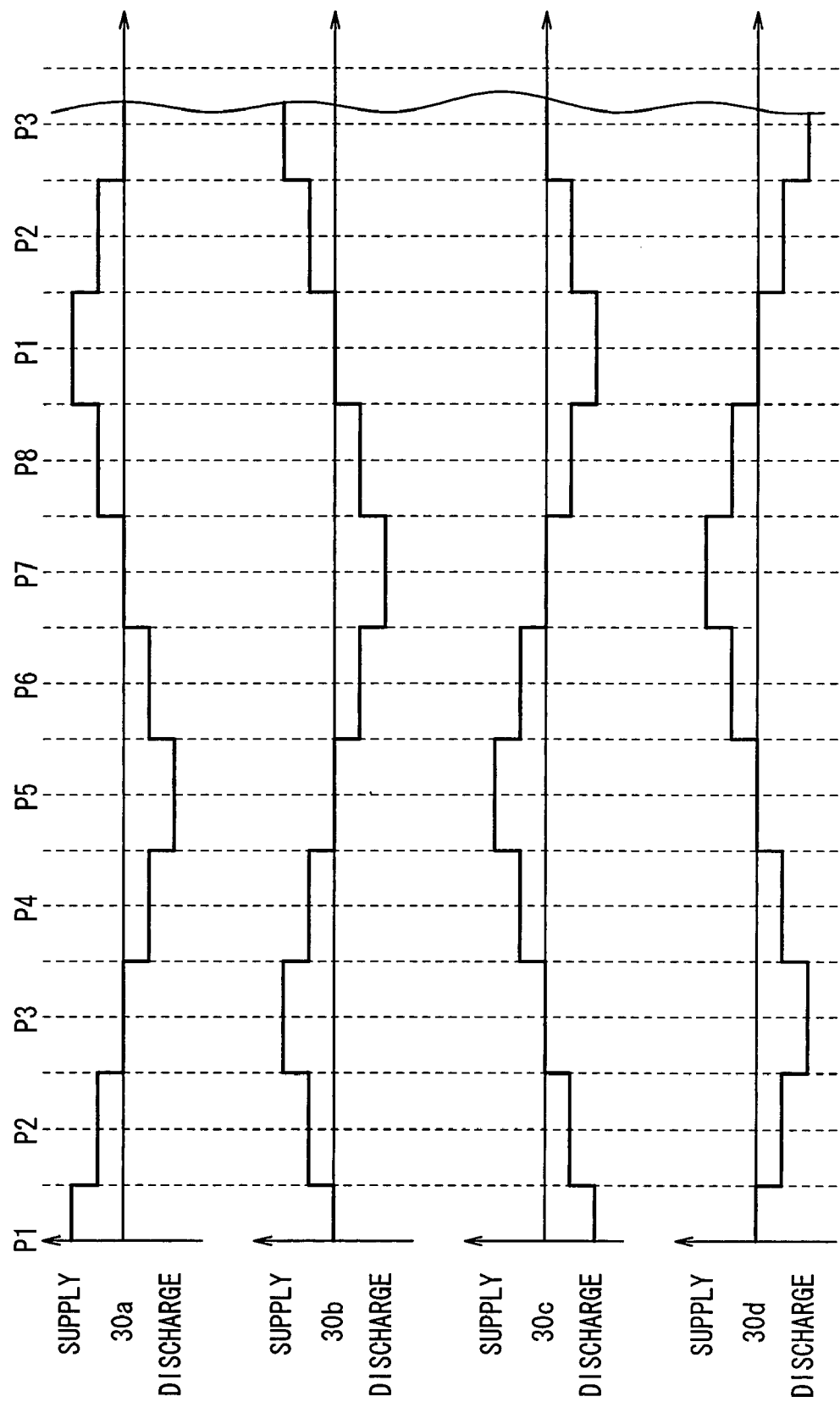
FIG. 7 is a diagram showing a pattern of positions in which oxygen-containing gas ports are selectively used for supplying and discharging an oxygen-containing gas.

Specifically, the cathode controller 16 controls the first and second switching mechanisms 64, 68 to selectively connect the first through fourth oxygen-containing gas holes 30a, 30b, 30c, 30d successively in the first through eighth positions P1 through P8 according to the pattern shown in FIG. 7 (see FIG. 6). The anode controller 18 and the coolant controller 20 control the first and second switching mechanisms 80, 82 and the first and second switching mechanisms 84, 86 to selectively switch the first through fourth fuel gas holes 34a, 34b, 34c, 34d and the first through fourth coolant holes 32a, 32b, 32c, 32d successively in the first through eighth positions P11 through P18 and the first through eighth positions P21 through P28 (see FIGS. 8 and 9).

In the oxygen-containing gas flow field 42, as shown in FIGS. 6 and 7, only the first oxygen-containing gas hole 30a is used as the oxygen-containing gas supply port and only the third oxygen-containing gas hole 30c is used as the. oxygen-containing gas discharge port in the first position P1. To change the direction of the flow in the oxygen-containing gas flow field 42, the first position P1 changes through the second position P2 to the third position P3.

Therefore, the oxygen-containing gas supply port does not switch directly from the first oxygen-containing gas hole 30a to the second oxygen-containing gas hole 30b, but the first and second oxygen-containing gas holes 30a, 30b are temporarily simultaneously used as the oxygen-containing gas supply ports in the second position P2 before the oxygen-containing gas supply port switches to the second oxygen-containing gas hole 30b.

Similarly, when the third oxygen-containing gas hole 30c used as the oxygen-containing gas discharge port in the first position P1 changes to the fourth oxygen-containing gas hole 30d, the third and fourth oxygen-containing gas holes 30c, 30d are temporarily simultaneously, i.e., overlappingly, used as the oxygen-containing gas discharge port in the second position P2.

Therefore, when the oxygen-containing gas supply port and the oxygen-containing gas discharge port are changed, the flow of the oxygen-containing gas is not stopped, but the oxygen-containing gas can always be supplied to the electrode surface. In the fuel gas flow field 46, likewise, the flow of the fuel gas is not stopped when the fuel gas supply port and the fuel gas discharge port are changed. Consequently, the fuel cell 10 can reliably produce a stable output of electric energy.

The flow directions of the oxygen-containing gas and the fuel gas change continuously in the membrane electrode assembly 24. Therefore, current density distribution, water distribution, humidity distribution, and temperature distribution in the electrode surfaces are uniform. Thus, the power generation performance is improved. Further, since the load is uniformly applied, and the power generation is uniformly performed in the surfaces of the membrane electrode assembly 24, the durability of the membrane electrode assembly 24 is improved.

The oxygen-containing gas flow field 42, the fuel gas flow field 46, and the coolant flow field 50 are defined by the bosses 44, 48, 52, respectively. These bosses 44, 48, 52 make it possible for the flow directions of the fluids to be changed smoothly and reliably in the oxygen-containing gas flow field 42, the fuel gas flow field 46, and the coolant flow field 50.

According to the first embodiment, when the first through fourth oxygen-containing gas holes 30a, 30b, 30c, 36d are selectively switched successively in the first through eighth positions P1 through P8, the first through fourth fuel gas holes 34a, 34b, 34c, 34d and the first through fourth coolant holes 32a, 32b, 32c, 32d are synchronously selectively switched successively in the first through eighth positions P11 through P18 and the first through eighth positions P21 through P28, respectively.

Figure 10:
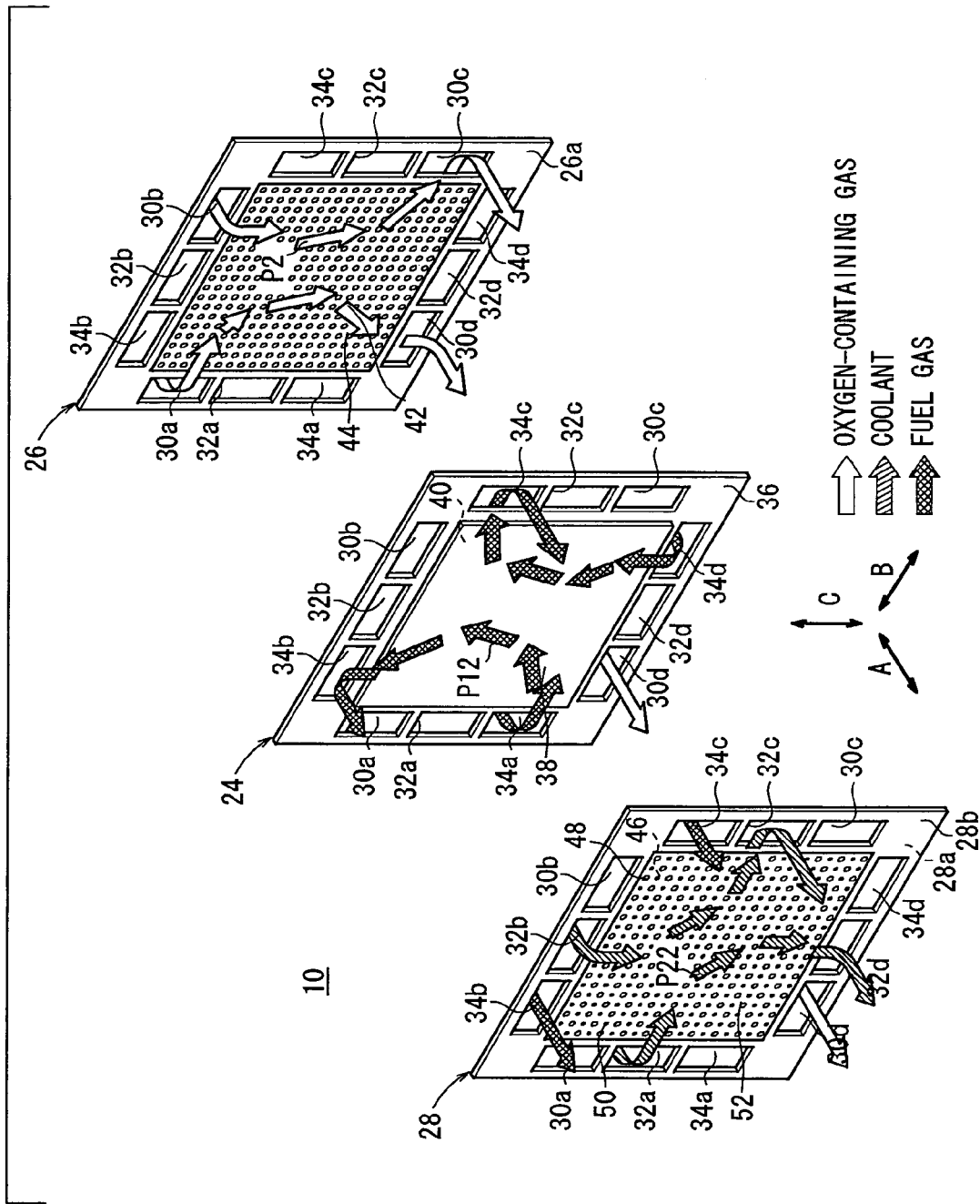
FIG. 10 is an exploded perspective view of the fuel cell in a second position.
Figure 11:
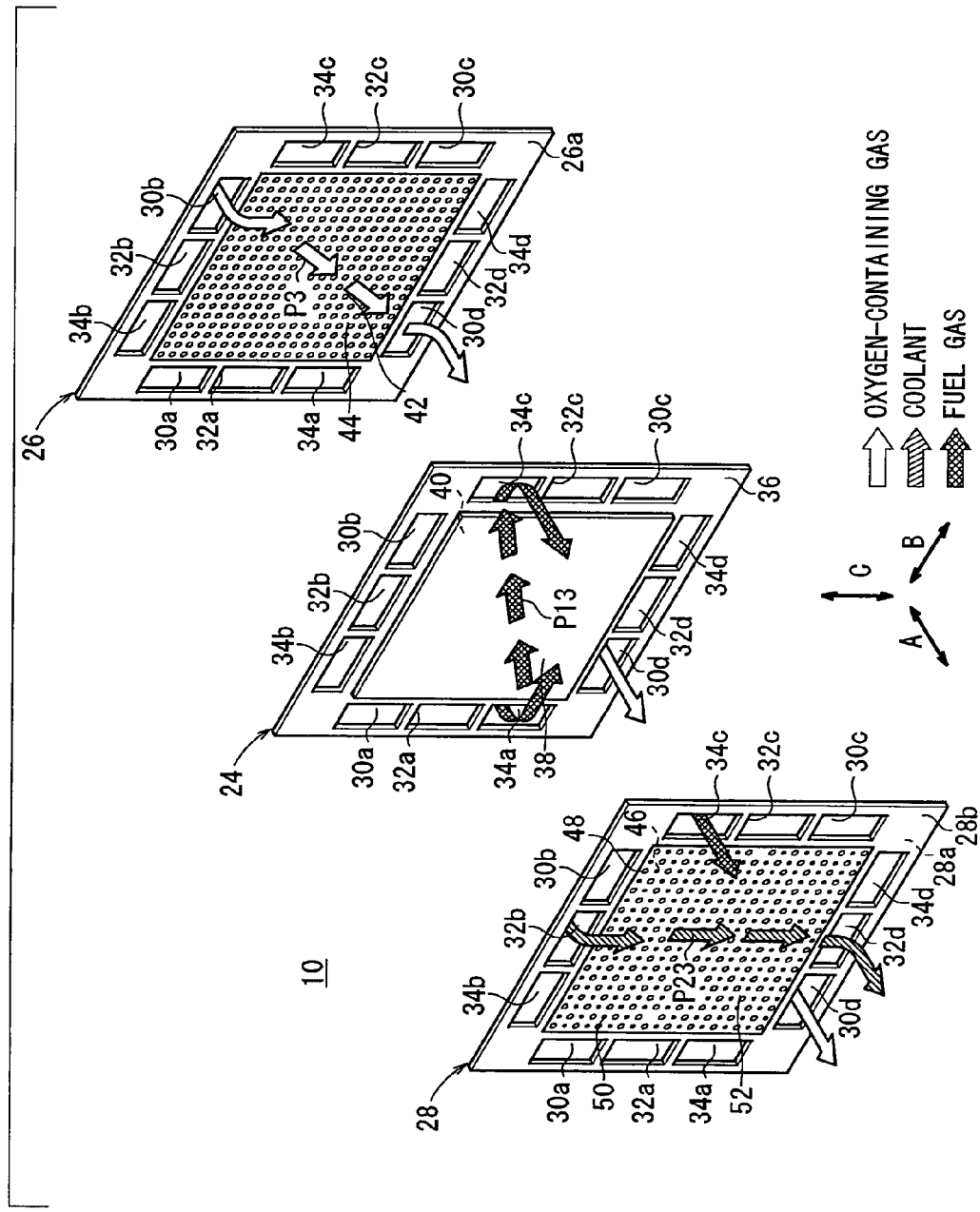
FIG. 11 is an exploded perspective view of the fuel cell in a third position.
Figure 12:
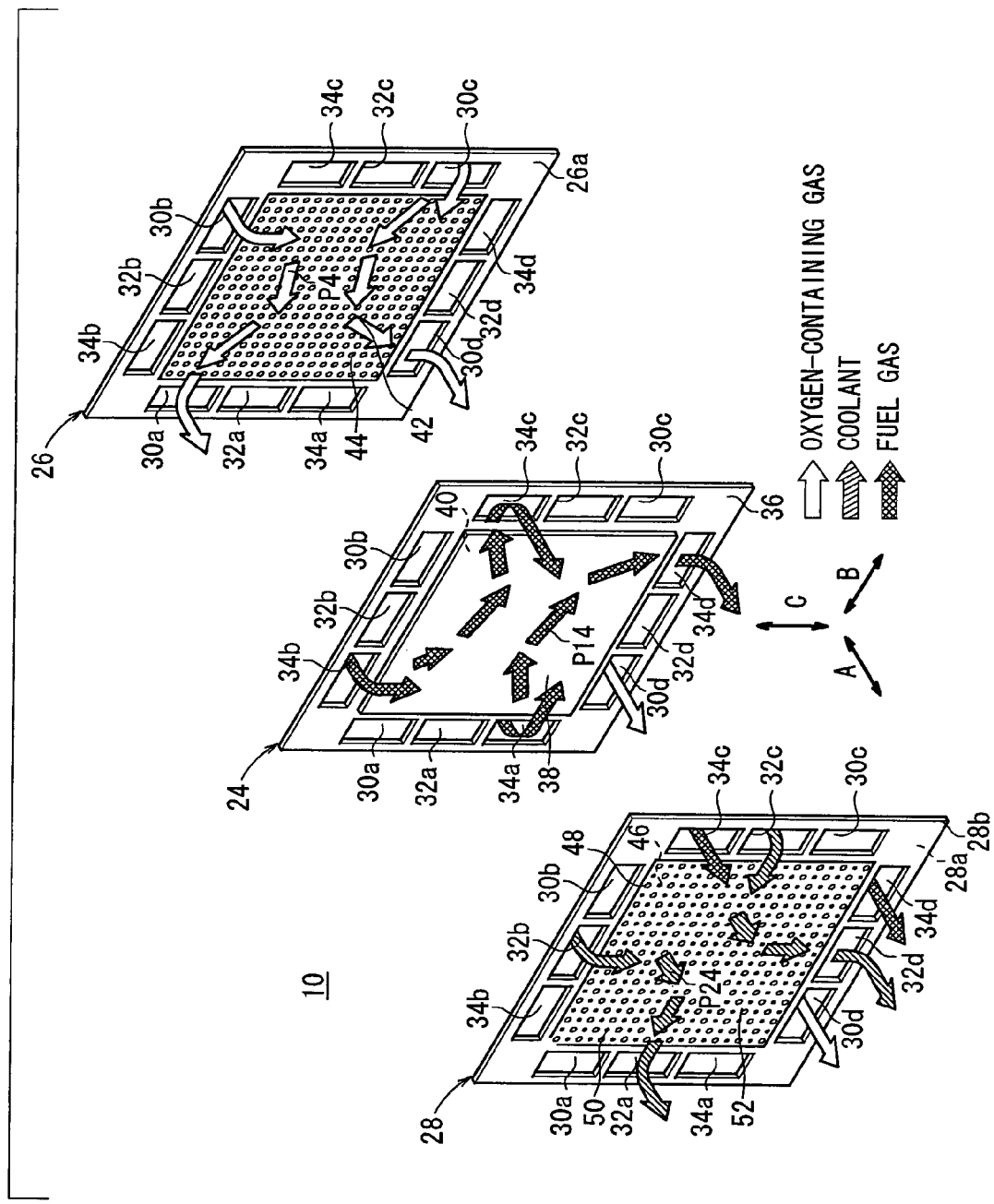
FIG. 12 is an exploded perspective view of the fuel cell in a fourth position.

During this time, the oxygen-containing gas supplied to the oxygen-containing gas flow field 42 and the fuel gas supplied to the fuel gas flow field 46 flow as substantial counterflows at all times. For example, in the first positions P1, P11 shown in FIG. 2, the second positions P2, P12 shown in FIG. 10, the third positions P3, P13 shown in FIG. 11, and the fourth positions P4, P14 shown in FIG. 12, the oxygen-containing gas and the fuel gas flow as substantial counterflows.

Consequently, the oxygen-containing gas discharge port of the oxygen-containing gas flow field 42 which tends to be highly humid due to produced water confronts the fuel gas supply port of the fuel gas flow field 46 which is supplied with the fuel gas that has relatively low humidity.

Therefore, the moisture moves from the oxygen-containing gas outlet to the fuel gas inlet across the membrane electrode assembly 24, thus removing condensed water from the oxygen-containing gas flow field 42 and the desired humidity is kept in the fuel gas flow field 46 with the supply of the fuel gas having low or no humidity.

In the coolant flow field 50, while the oxygen-containing gas flow field 42 is being shifted successively from the first position P1 to the eighth position P8, the oxygen-containing gas supplied to the oxygen-containing gas flow field 42 and the coolant supplied to the coolant flow field 50 flow as substantially parallel flows (see FIGS. 6 and 9). These parallel flows of the oxygen-containing gas and the coolant are clearly illustrated in the first positions P1, P21 through the fourth positions P4, P24 as shown in FIGS. 2, 10, 11, and 12.

The oxygen-containing gas outlet of the oxygen-containing gas flow field 42 is heated by the coolant which has its temperature increased by having cooled the membrane electrode assembly 24. Therefore, although the oxygen-containing gas outlet is made highly humid by the produced water, its relatively humidity is lowered by the heat from the coolant, and the oxygen-containing gas outlet is prevented from condensing water therein.

According to the first embodiment, furthermore, as shown in FIG. 1, a plurality of fuel cells 10 are vertically stacked to provide the fuel cell stack 14. The vertical fuel cell stack 14 permits condensed water produced therein to move smoothly by gravity and be efficiently discharged therefrom rather than staying downstream in the fuel cells 10 which would be erected if the fuel cells 10 were stacked substantially horizontally.

It is also possible to make effective use of the water produced by the reaction in the fuel cell to reduce the stoichiometric ratios of the fuel gas and the oxygen-containing gas. The fuel cell 10 according to the present invention is much less costly and hence is economical because it needs no humidifier and no complex water retriever.

Figure 13:
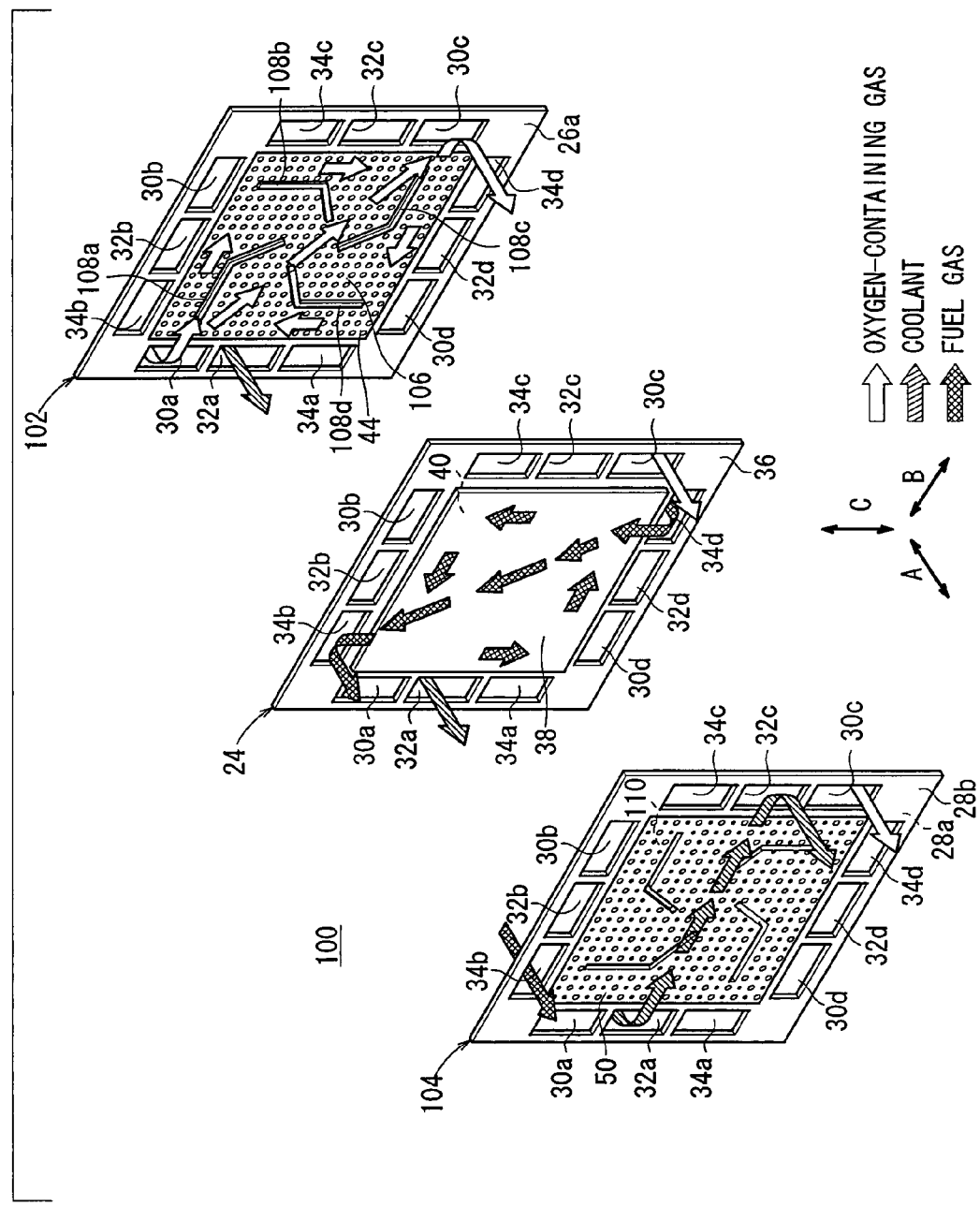
FIG. 13 is an exploded perspective view showing main components of a fuel cell according to a second embodiment of the present invention.
Figure 14:
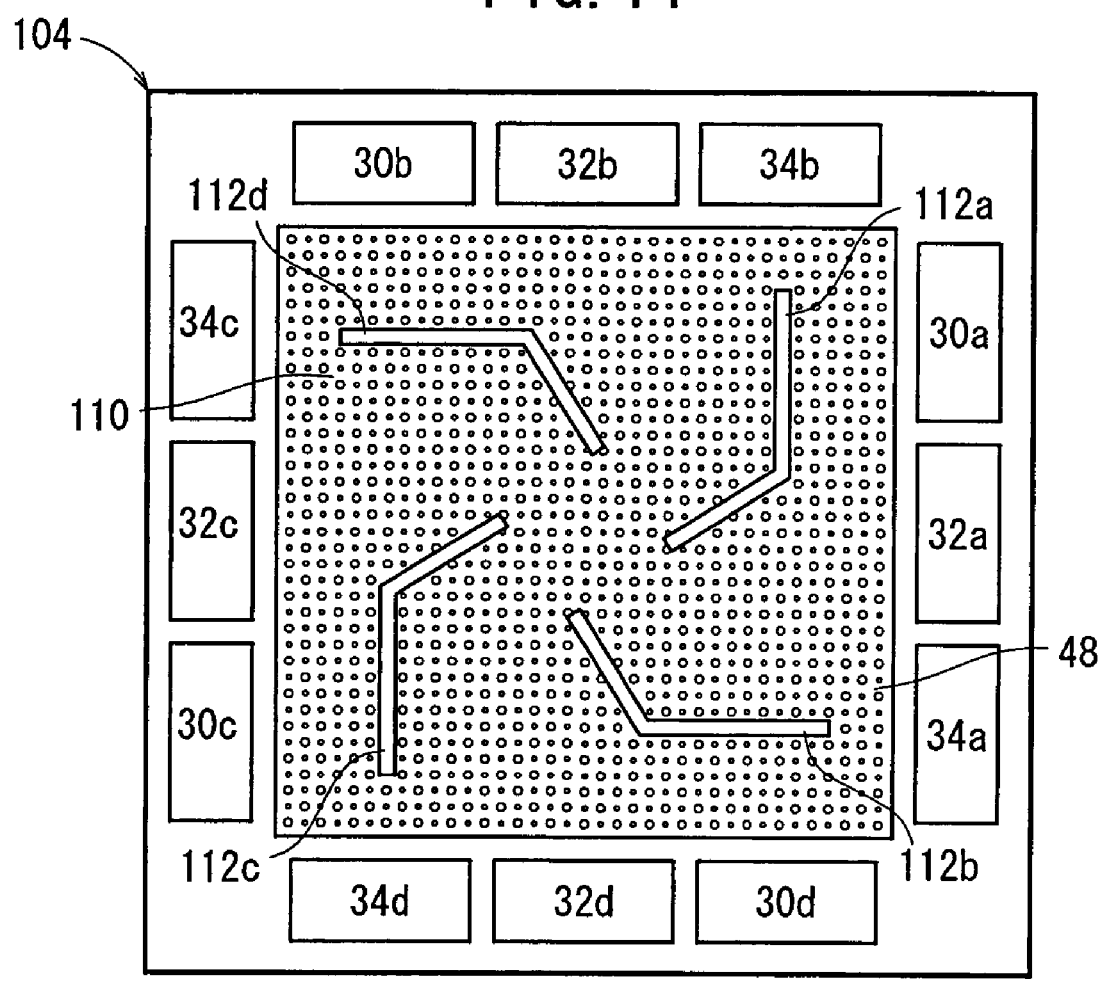
FIG. 14 is a front view showing a second separator of the fuel cell.

FIG. 13 shows in exploded perspective a fuel cell 100 according to a second embodiment of the present invention. The constituent elements of the fuel cell 100 which are identical to those of the fuel cell 10 according to the first embodiment are denoted by identical reference characters, and will not be described in detail below. The constituent elements of fuel cells according to third through sixth embodiments to be described below which are identical to those of the fuel cell 10 according to the first embodiment are also denoted by identical reference characters, and will not be described in detail below.

As shown in FIG. 13, the fuel cell 100 has a membrane electrode assembly 24. The fuel cell 100 includes first and second metallic separators 102, 104, for sandwiching the membrane electrode assembly 24. Each of the separators 102, 104 has a substantially square shape. The first separator 102 has an oxygen-containing gas flow field (fluid flow field) 106. A plurality of bosses 44, and guide ribs 108a, 108b, 108c, and 108d are formed in the oxygen-containing gas flow field 106. Each of the ribs 106a, 106b, 106c, and 106d connect predetermined bosses 44. The ribs 108a, 108b, 108c, and 108d are spaced around the center of the electrode surface at an equal angle, and bent in a dogleg shape corresponding to the first through fourth oxygen-containing gas holes 30a through 30d.

The second separator 104 has a fuel gas flow field (fluid flow field) 110 on its surface facing the anode 38. A plurality of bosses 48, and guide ribs 112a, 112b, 112c, and 112d are formed in the fuel gas flow field 110. Each of the ribs 112a, 112b, 112c, and 112d connect predetermined bosses 44. The ribs 112a, 112b, 112c, and 112d are spaced around the center of the electrode surface at an equal angle, and bent in a dogleg shape corresponding to the first through fourth fuel gas holes 34a through 34d.

Figure 15:
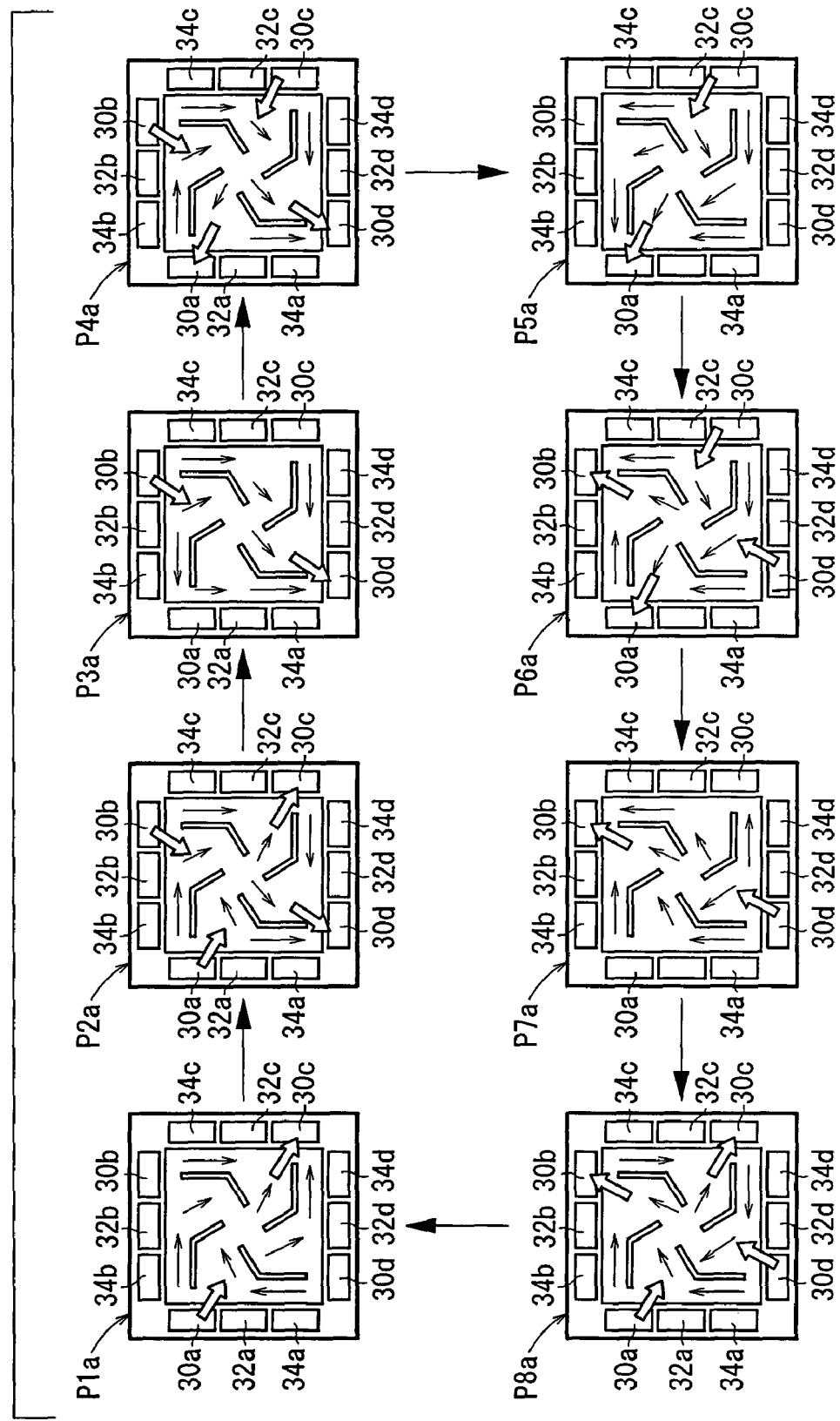
FIG. 15 is a diagram showing a pattern of positions in which oxygen-containing gas ports are selectively used for supplying and discharging an oxygen-containing gas.

As shown in FIG. 15, in the oxygen-containing gas flow field 106 of the first separator 102, the first through fourth oxygen-containing gas holes 30a through 30d are successively switched from the first position P1a, the second position P2a, the third position P3a, the fourth position P4a, the fifth position P5a, the sixth position P6a, the seventh position P7a, and into the eighth position P8a. Therefore, the flow direction of the oxygen-containing gas is changed continuously.

In the second embodiment, as shown in FIG. 15, the first through fourth oxygen-containing gas holes 30a through 30d are successively switched from the first position P1a to the eighth position P8a. During the switching operation from one position to another position, the oxygen-containing gas holes are used temporarily simultaneously, i.e., overlappingly. Therefore, the flow of the oxygen-containing gas is not interrupted, and the flow direction of the oxygen-containing gas is-changed continuously as with the first embodiment.

The bosses 44 and ribs 108a through 108d are formed in the oxygen-containing gas flow field 106. The ribs 108a through 108a guide the flow of the oxygen-containing gas so that the oxygen-containing gas can be uniformly distributed substantially over the entire surface of the electrode. Thus, the power generation can be efficiently performed, and the desired power generation performance can be reliably maintained.

Figure 16:
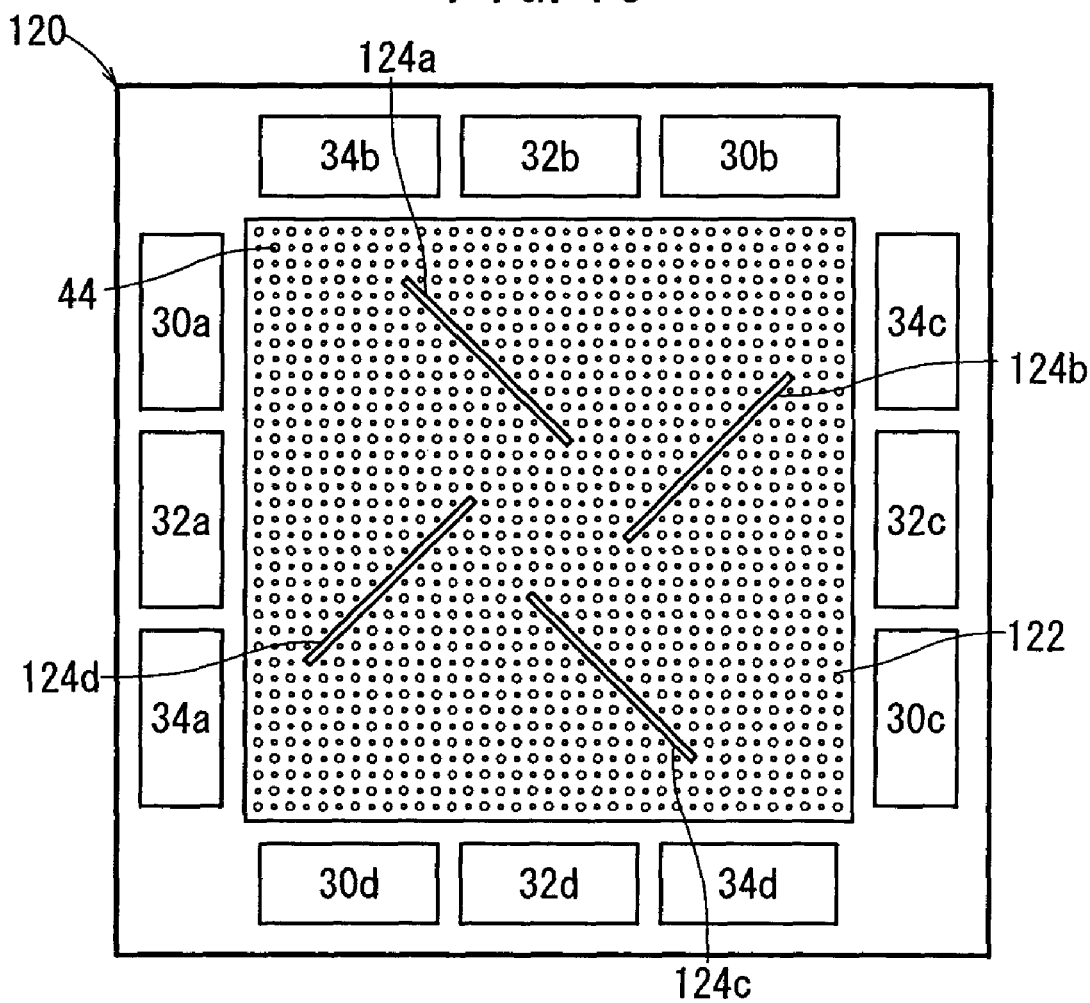
FIG. 16 is a front view showing a first separator of a fuel cell according to a third embodiment of the present invention.
Figure 17:
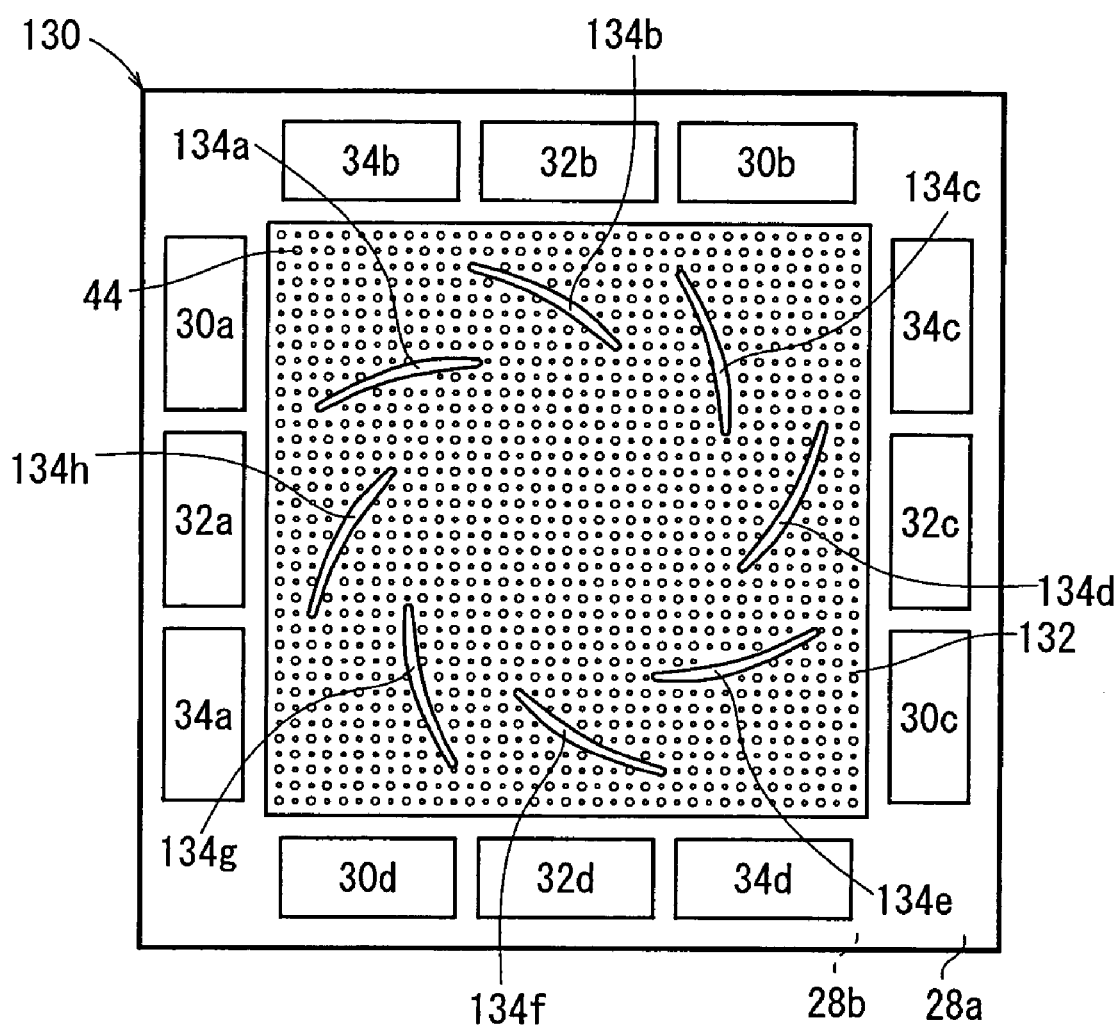
FIG. 17 is a front view showing a first separator of a fuel cell according to a fourth embodiment of the present invention.

FIG. 16 is a front view showing a first separator 120 of a fuel cell according to a third embodiment of the present invention. FIG. 17 is a front view of a separator 130 of a fuel cell according to a fourth embodiment of the present invention.

As shown in FIG. 16, the first separator 120 has an oxygen containing gas flow field 122. A plurality of bosses 44, and guide ribs 124a, 124b, 124c, and 124d are formed in the oxygen-containing gas flow field 122. Each of the guide ribs 124a, 124b, 124c, and 124d extends straight between predetermined bosses 44.

As shown in FIG. 17, the first separator 130 has an oxygen-containing gas flow field 132. A plurality of bosses 44, and guide ribs 134a, 134b, 134c, and 134d are formed in the oxygen-containing gas flow field 132. Each of the guide ribs 134a, 134b, 134c, and 134d are curved between predetermined bosses 44.

In the third and fourth embodiments, the ribs 124a through 124d are formed in the oxygen-containing gas flow field 122, and the ribs 134a through 134d are formed in the oxygen-containing gas flow field 132, respectively. Therefore, when the flow direction of the oxygen-containing gas is changed, the ribs 124a through 124d or the ribs 134a through 134d guide the oxygen-containing gas for distributing the oxygen-containing gas on the electrode surface substantially uniformly. Thus, the desired power generation performance of the fuel cell is effectively maintained, as with the second embodiment.

Figure 18:
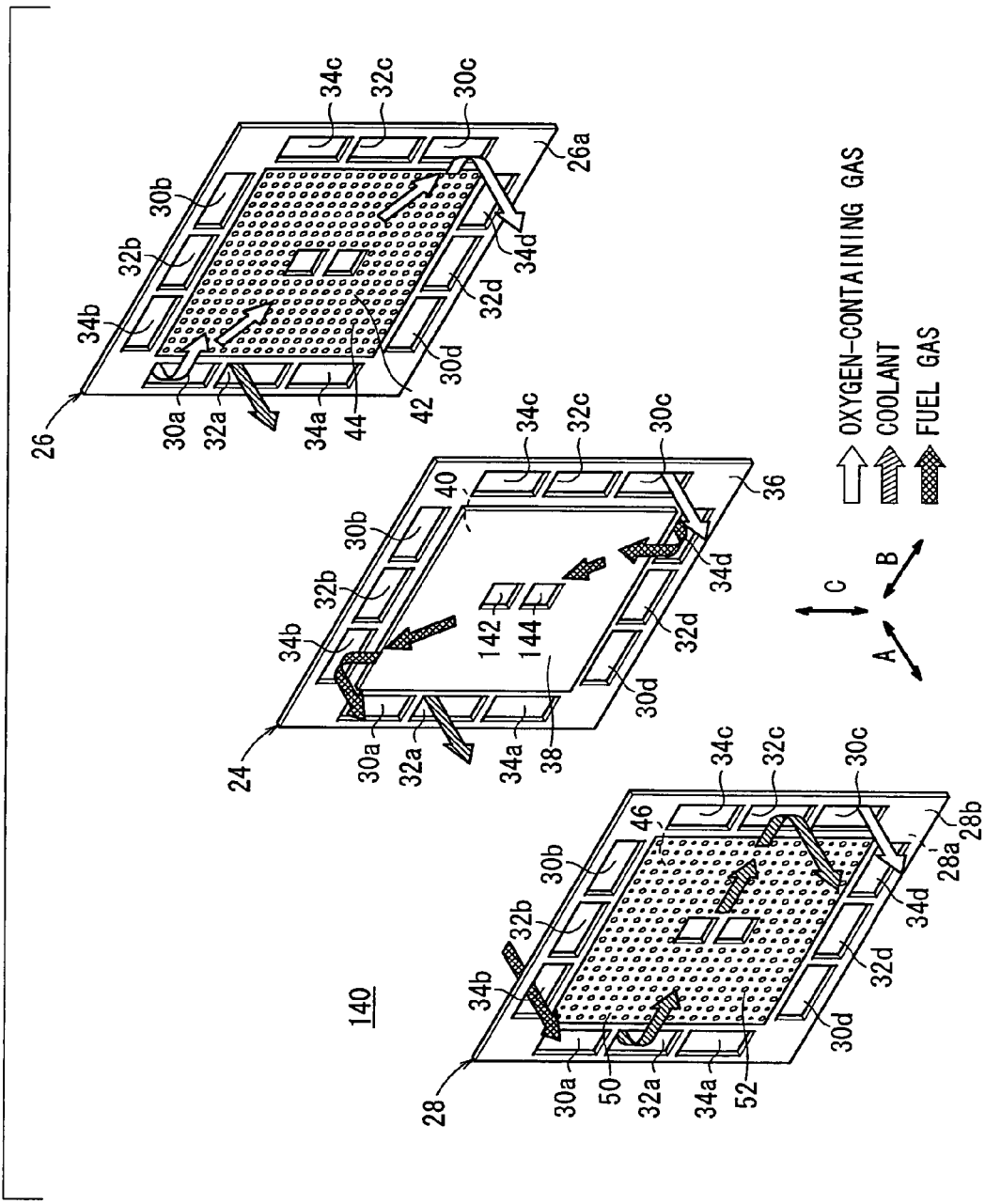
FIG. 18 is an exploded perspective view showing main components of a fuel cell according to a fifth embodiment of the present invention.

FIG. 18 shows in exploded perspective main components of a fuel cell 140 according to a fifth embodiment of the present invention.

As shown in FIG. 18, the fuel cell 140 has an inner oxygen-containing gas hole 142 and an inner fuel gas hole 144 defined in the electrode surfaces and extending through the membrane electrode assembly 24 and the first and second separators 26, 28 in the direction indicated by the arrow A. The inner oxygen-containing gas hole 142 can be used selectively as the oxygen-containing gas supply port and the oxygen-containing gas discharge port, and the inner fuel gas hole 144 can be used selectively as the fuel gas supply port and the fuel gas discharge port.

Figure 19:
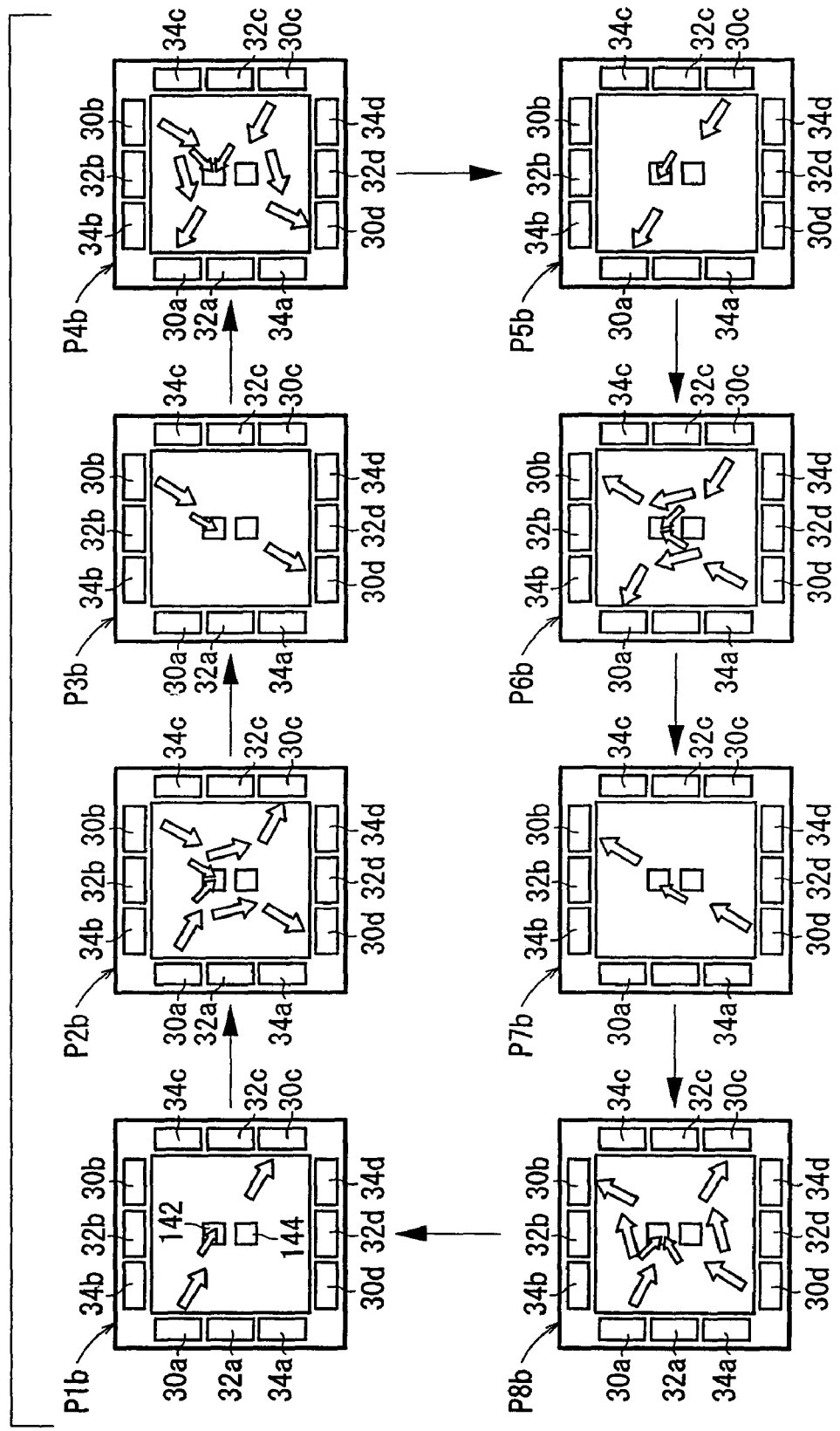
FIG. 19 is a view illustrative of the manner in which an inner oxygen-containing gas hole is used as an oxygen-containing gas discharge port in the fuel cell shown in FIG. 18.

The inner oxygen-containing gas hole 142 are selectively used as the oxygen-containing gas discharge port by successively switching first through eighth positions P1b through P8b, as shown in FIG. 19.

Figure 20:
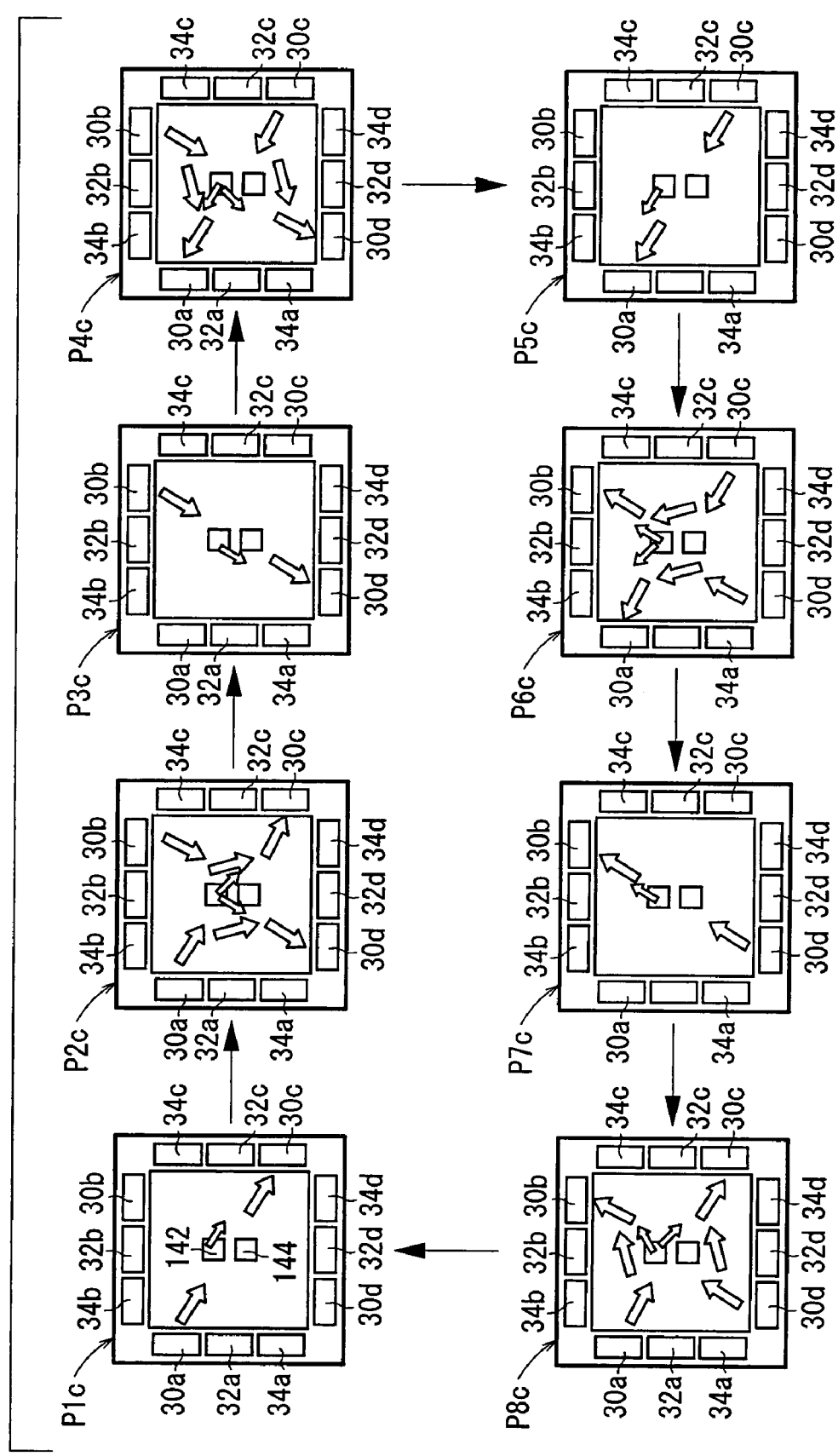
FIG. 20 is a view illustrative of the manner in which the inner oxygen-containing gas hole is used as an oxygen-containing gas supply port in the fuel cell shown in FIG. 18.

The inner oxygen-containing gas hole 142 is selectively used as the oxygen-containing gas supply port by successively switching first through eighth positions P1c through P8c, as shown in FIG. 20.

According to the fifth embodiment, as described above, the inner oxygen-containing gas hole 142 is defined substantially centrally in the electrode surfaces and used as the oxygen-containing gas supply port or the oxygen-containing gas discharge port. Therefore, the electric surface can be maintained in a uniform state, and the performance of the fuel cell 140 to generate electric energy is improved.

If the fuel cell 140 produces a low output, then the inner oxygen-containing gas hole 142 and the inner fuel gas hole 144 are not used. If the fuel cell 140 produces a high output, then the inner oxygen-containing gas hole 142 and the inner fuel gas hole 144 are used. Specifically, based on the direct relationship between the magnitude of the output of the fuel cell 140 and the magnitude of the consumption of the reactant gases, the supply and discharge of the reactant gases is reduced if the fuel cell 140 produces a low output, and the supply and discharge of the reactant gases is increased if the fuel cell 140 produces a high output. In this manner, the fuel cell 140 is able to reliably produce a desired output.

The fuel cell 140 may have a plurality of inner oxygen-containing gas holes 142 and a plurality of inner fuel gas holes 144, and the number of inner oxygen-containing gas holes 142 to be used and the number of inner fuel gas holes 144 to be used may be changed depending on the load on the fuel cell 140. In this case, also based on the above relationship, the supply and discharge of the reactant gases is reduced if the fuel cell 140 produces a low output, and the supply and discharge of the reactant gases is increased if the fuel cell 140 produces a high output. In this manner, the fuel cell 140 is able to reliably produce a desired output.

Figure 21:
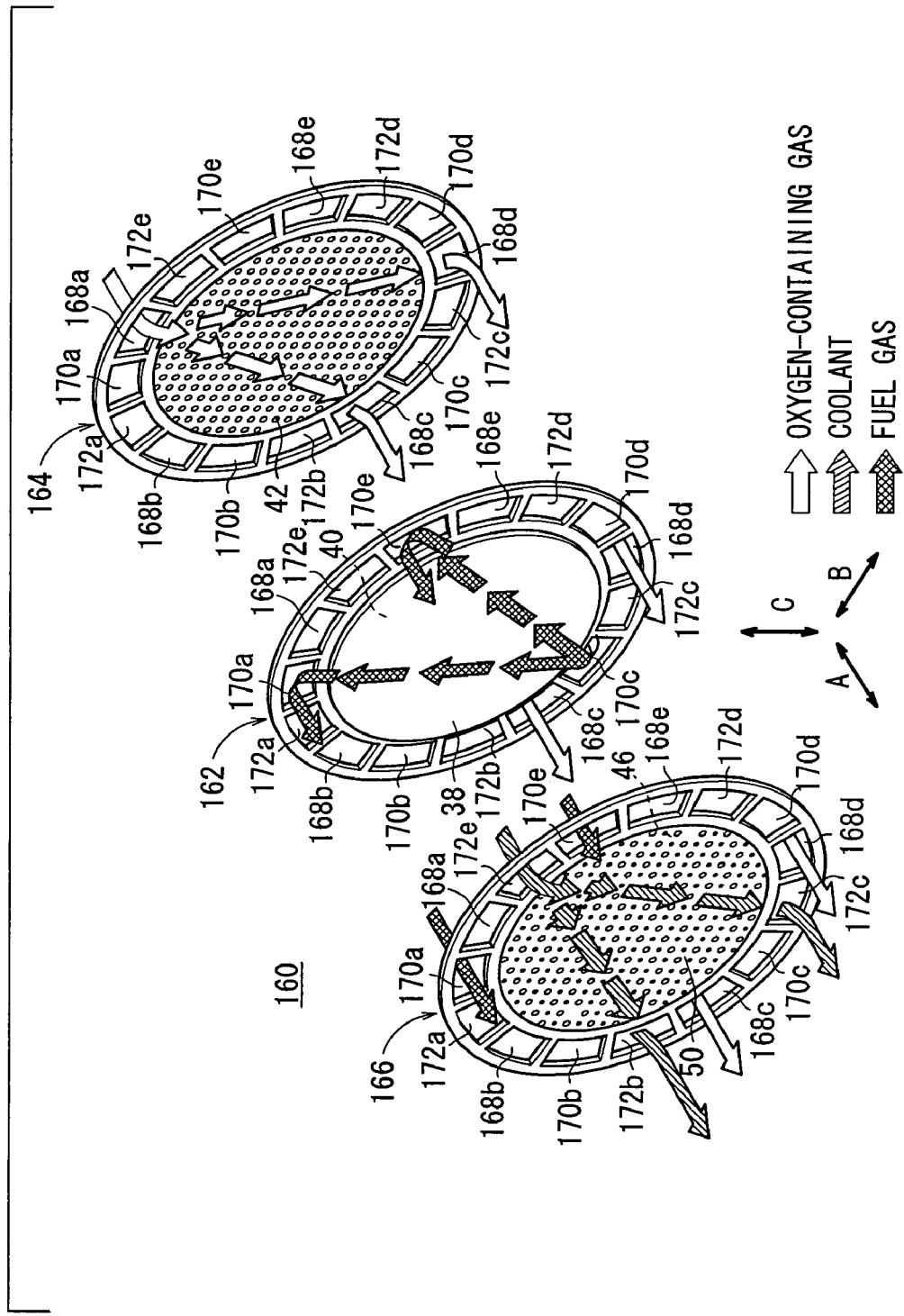
FIG. 21 is an exploded perspective view showing main components of a fuel cell according to a sixth embodiment of the present invention.

FIG. 21 shows in exploded perspective main components of a fuel cell 160 according to a sixth embodiment of the present invention.

As shown in FIG. 21, the fuel cell 160 has a substantially disk-shaped membrane electrode assembly (electrolyte electrode assembly) 162 and substantially disk-shaped first and second separators 164, 166 of metal which sandwich the membrane electrode assembly 162 therebetween. The fuel cell 160 has, defined in its outer circumferential edge portions, a first oxygen-containing gas hole 168a, a second oxygen-containing gas hole 168b, a third oxygen-containing gas hole 168c, a fourth oxygen-containing gas hole 168d, and a fifth oxygen-containing gas hole 168e which are positioned radially outwardly of the anode 38 and the cathode 40 and spaced at predetermined angular intervals. The first through fifth oxygen-containing gas holes 168a through 168e extend through the membrane electrode assembly 162 and the first and second separators 164, 166 in the direction indicated by the arrow A.

The fuel cell 160 also has a first fuel gas hole 170a and a first coolant hole 172a which are defined its outer circumferential edge portions and positioned circumferentially between the first oxygen-containing gas hole 168a and the second oxygen-containing gas hole 168b, a second fuel gas hole 170b and a second coolant hole 172b which are defined its outer circumferential edge portions and positioned circumferentially between the second oxygen-containing gas hole 168b and the third oxygen-containing gas hole 168c. and a third fuel gas hole 170c and a third coolant hole 172c which are defined its outer circumferential edge portions and positioned circumferentially between the third oxygen-containing gas hole 168c and the fourth oxygen-containing gas hole 168d.

The fuel cell 160 also has a fourth fuel gas hole 170d and a fourth coolant hole 172d which are defined its outer circumferential edge portions and positioned circumferentially between the fourth oxygen-containing gas hole 168d and the fifth oxygen-containing gas hole 168e, and a fifth fuel gas hole 170e and a fifth coolant hole 172e which are defined its outer circumferential edge portions and positioned circumferentially between the fifth oxygen-containing gas hole 168e and the first oxygen-containing gas hole 168a.

Figure 22:
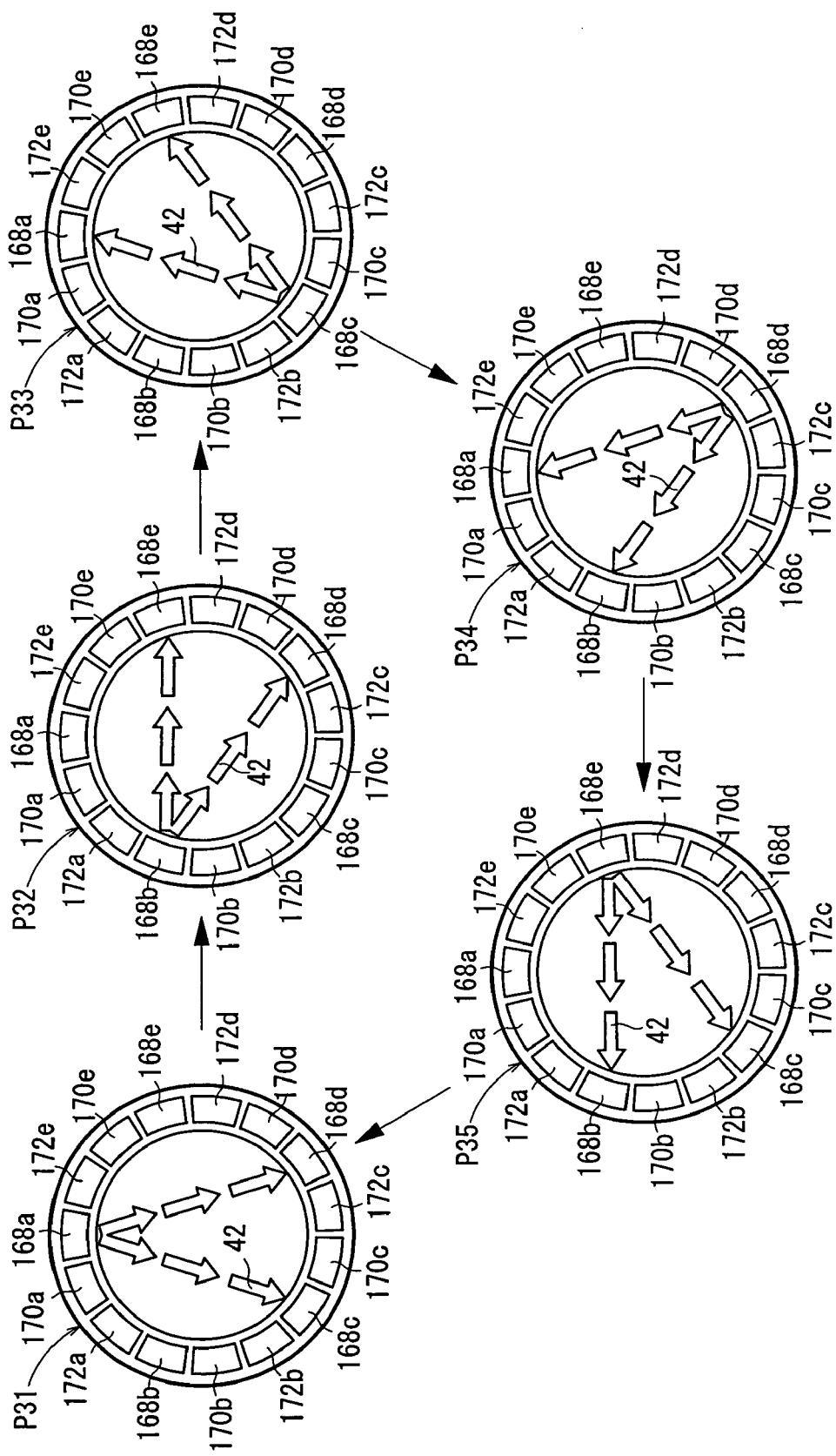
FIG. 22 is a view illustrative of the manner in which the direction of a flow in an oxygen-containing gas flow field is changed in the fuel cell.

As shown in FIG. 22, as for the oxygen-containing gas flow field 42, one of the first through fifth oxygen-containing gas holes 168a through 168e is selected as the oxygen-containing gas supply port, and two of the first through fifth oxygen-containing gas holes 168a through 168e are selected as the oxygen-containing gas discharge ports. The first through fifth oxygen-containing gas holes 168a through 168e are selectively used successively in a first position P31, a second position P32, a third position P33, a fourth position P34, and a fifth position P35.

Figure 23:
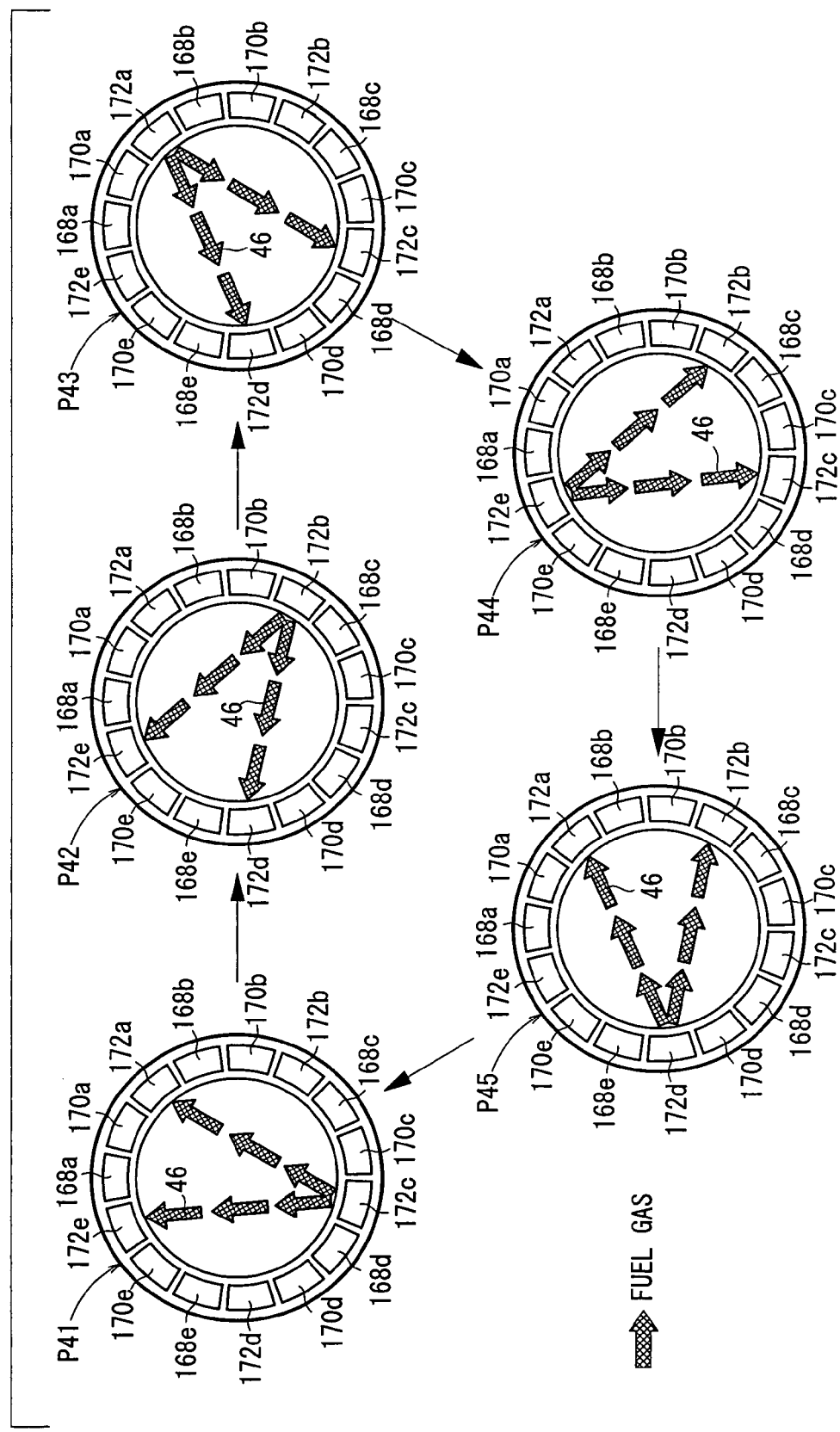
FIG. 23 is a view illustrative of the manner in which the direction of a flow in a fuel gas flow field is changed in the fuel cell.

As shown in FIG. 23, as for the fuel gas flow field 46, one of the first through fifth fuel gas holes 170a through 170e is selected as the fuel gas supply port, and two of the first through fifth fuel gas holes 170a through 170e is selected as the fuel gas discharge port. The first through fifth fuel gas holes 170a through 170e are selectively used successively in a first position P41, a second position P42, a third position P43, a fourth position P44, and a fifth position P45.

Figure 24:
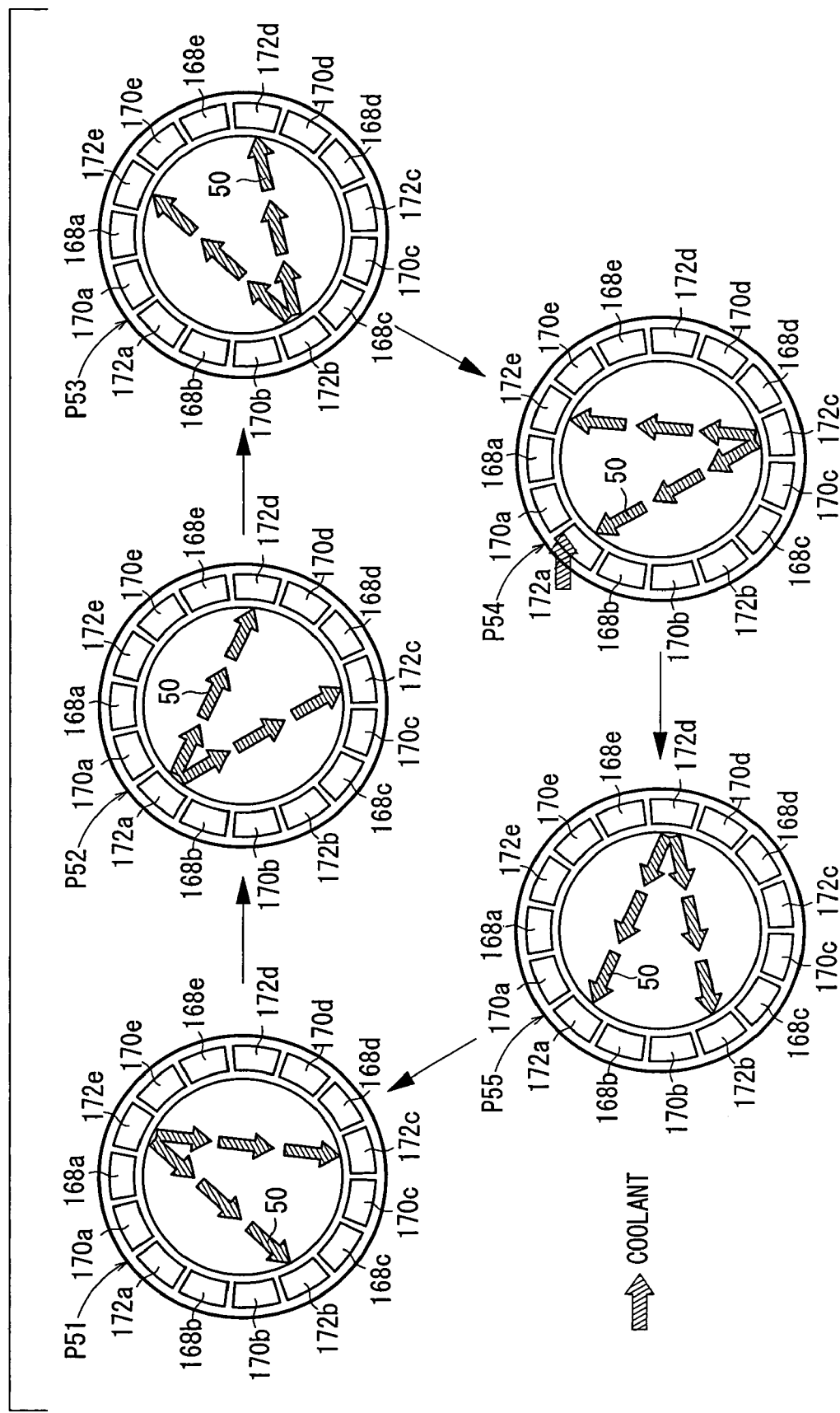
FIG. 24 is a view illustrative of the manner in which the direction of a flow in a coolant flow field is changed in the fuel cell.

As shown in FIG. 24, as for the coolant flow field 50, one of the first through fifth coolant holes 172a through 172e is selected as the coolant supply port, and two of the first through fifth coolant holes 172a through 172e is selected as the coolant discharge port. The first through fifth coolant holes 172a through 172e are selectively used successively in a first position P51, a second position P52, a third position P53, a fourth position P54, and a fifth position P55.

According to the sixth embodiment, the oxygen-containing gas flow field 42, the fuel gas flow field 46, and the coolant flow field 50 are successively changed in synchronism with the fluid holes being selectively used in the first positions P31, P41, P51 through the fifth positions P35, P45, P55. As the oxygen-containing gas flow field 42, the fuel gas flow field 46, and the coolant flow field 50 are thus successively changed, the oxygen-containing gas, the fuel gas, and the coolant are introduced from the respective supply ports and discharged into the respective discharge ports. Therefore, the oxygen-containing gas, the fuel gas, and the coolant flow circularly well in the oxygen-containing gas flow field 42, the fuel gas flow field 46, and the coolant flow field 50, respectively.

With respect to the oxygen-containing gas flow field 42, for example, the first oxygen-containing gas hole 168a is used as the oxygen-containing gas supply port, and the third oxygen-containing gas hole 168c is used as the oxygen-containing gas discharge port (see the first position P31). When the first position P31 switches to the second position P32, the first and second oxygen-containing gas holes 168a, 168b are temporarily used as the oxygen-containing gas supply ports, and then only the second oxygen-containing gas hole 168b is used as the oxygen-containing gas supply port. In the first position P31 and the second position P32, the fourth oxygen-containing gas hole 168d is continuously used as the oxygen-containing gas discharge port.

According to the sixth embodiment, therefore, when the first position P31 switches to the second position P32, the flow of the oxygen-containing gas is not stopped, allowing the fuel cell 160 to reliably produce a stable output of electric energy. The third embodiment offers the same advantages as those of the first embodiment.

According to the sixth embodiment, furthermore, in the oxygen-containing gas flow field 42 and the fuel gas flow field 46, the directions in which the oxygen-containing gas and the fuel gas flow are changed in synchronism with each other, and the oxygen-containing gas and the fuel gas flow as substantial counterflows at all times. The oxygen-containing gas in the oxygen-containing gas flow field 42 and the coolant in the coolant flow field 50 flow as substantially parallel flows at all times. Consequently, the water produced by the reaction can effectively be used, and the ability of the fuel cell 160 to generate electric energy is increased, as with the first embodiment.

According to the sixth embodiment, moreover, the electric surface can be maintained in a uniform state by changing the number of inlets and outlets depending on the magnitude of the output of the fuel cell 160, reductions in the output of the fuel cell 160, the distribution of water on the electrode surfaces, and the distribution of current densities on the electrode surfaces.

For example, in the oxygen-containing gas flow field 42, one of the first through fifth oxygen-containing gas holes 168a through 168e may be used as the oxygen-containing gas supply port, and one, two, three, or four of the first through fifth oxygen-containing gas holes 168a through 168e may be used as the oxygen-containing gas discharge ports. Two of the first through fifth oxygen-containing gas holes 168a through 168e may be used as the oxygen-containing gas supply ports, and one, two, or three of the first through fifth oxygen-containing gas holes 168a through 168e may be used as the oxygen-containing gas discharge ports. Three of the first through fifth oxygen-containing gas holes 168a through 168e may be used as the oxygen-containing gas supply ports, and one or two of the first through fifth oxygen-containing gas holes 168a through 168e may be used as the oxygen-containing gas discharge ports. Alternatively, four of the first through fifth oxygen-containing gas holes 168a through 168e may be used as the oxygen-containing gas supply ports, and one of the first through fifth oxygen-containing gas holes 168a through 168e may be used as the oxygen-containing gas discharge port.

Figure 25:
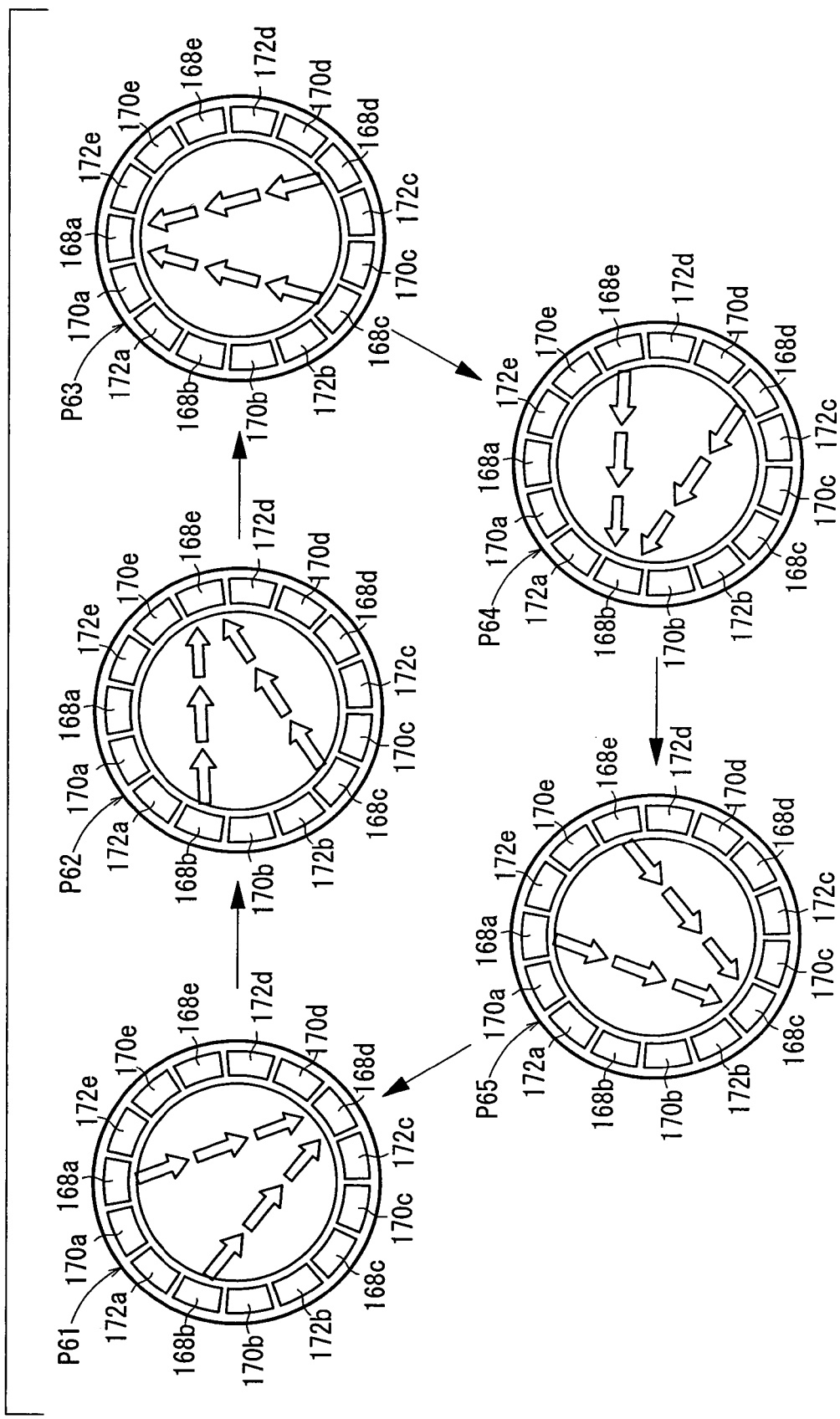
FIG. 25 is a view illustrative of the manner in which the flow direction of the oxygen-containing gas is changed when the fuel cell is operated at a low output.
Figure 26:
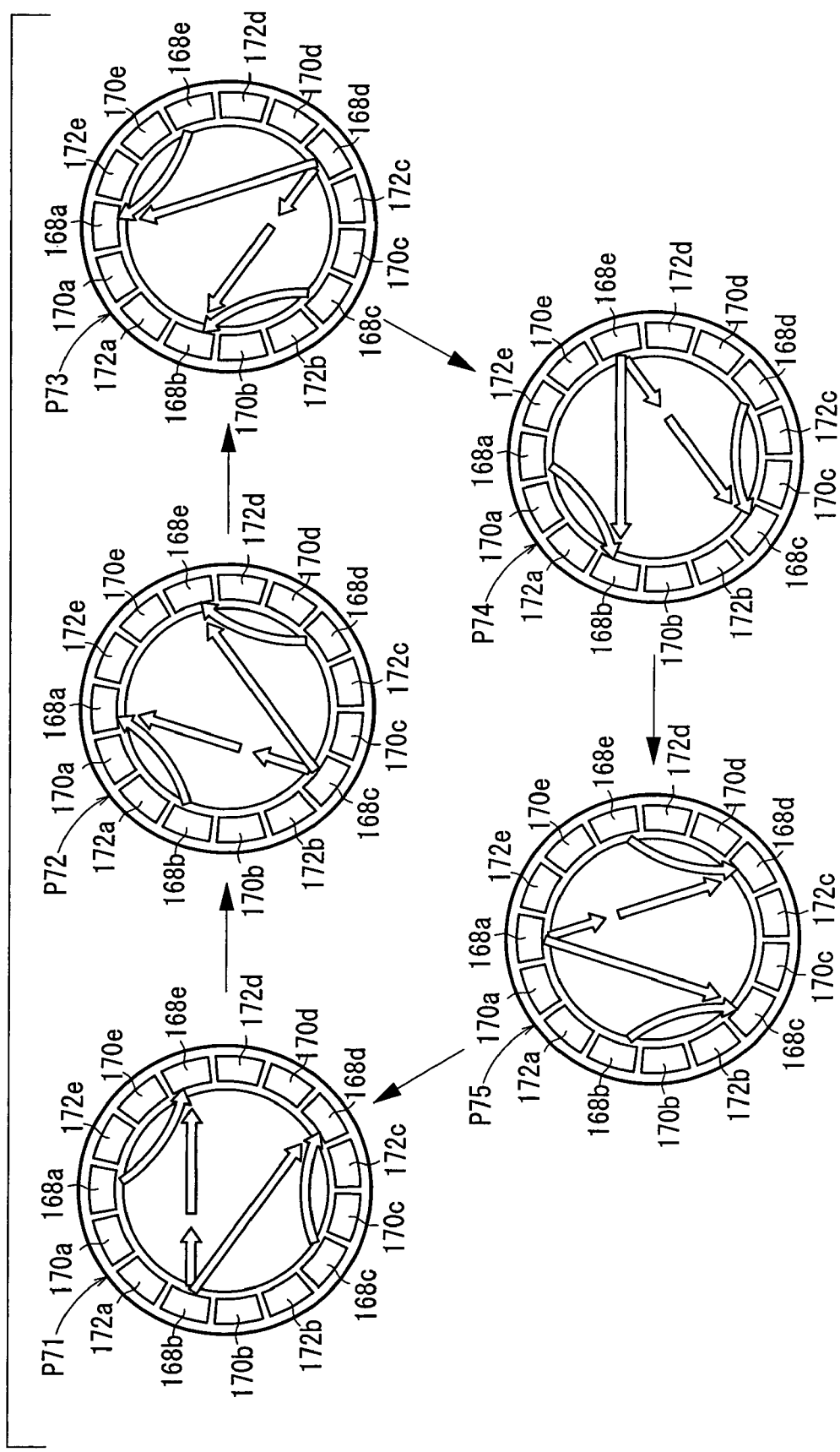
FIG. 26 is a view illustrative of the manner in which the flow direction of the oxygen-containing gas is changed when the fuel cell is operated at a high output.

FIG. 25 is a view illustrative of the manner in which the flow direction of the oxygen-containing gas is changed when the fuel cell 160 is operated at a low output, and FIG. 26 is a view illustrative of the manner in which the flow direction of the oxygen-containing gas is changed when the fuel cell 160 is operated at a high output.

For example, if the fuel cell 160 produces a low output, then since the oxygen-containing gas flows at a low rate, two of the first through fifth oxygen-containing gas holes 168a through 168e are used as the oxygen-containing gas supply ports, and one of the first through fifth oxygen-containing gas holes 168a through 168e is used as the oxygen-containing gas discharge port. The first through oxygen-containing gas holes 168a through 168e are selectively used successively in a first position P61, a second position P62, a third position P63, a fourth position P64, and a fifth position P65.

If the fuel cell 160 produces a high output, then since the oxygen-containing gas flows at a high rate, as shown in FIG. 26, one of the first through fifth oxygen-containing gas holes 168a through 168e is used as the oxygen-containing gas supply port, and two of the first through fifth oxygen-containing gas holes 168a through 168e are used as the oxygen-containing gas discharge ports. The first through oxygen-containing gas holes 168a through 168e are selectively used successively in a first position P67, a second position P72, a third position P73, a fourth position P74, and a fifth position P75. When the fuel cell 160 is operated to produce a low output, and operated to produce a high output, the oxygen-containing gas and the fuel gas flow as substantial counterflows at all times. The oxygen-containing gas and the coolant flow as substantially parallel flows at all times. Thus, any pressure loss in the oxygen-containing gas supply port and the oxygen-containing gas discharge port is reduced, improving the ability to distribute the oxygen-containing gas in the fuel cell 160.

In addition, the interval of time at which the oxygen-containing gas supply port and the oxygen-containing gas discharge port are switched may be made shorter when the fuel cell 160 produces a low output than when the fuel cell 160 produces a high output. In this case, if the fuel cell 160 produces a high output, then since the reactant gases are consumed at a high rate, the interval of time at which the oxygen-containing gas supply port and the oxygen-containing gas discharge port are switched is relatively reduced, uniformizing a distribution of reactant gases on the electrode surfaces thereby to supply the reactant gases stably over the entire electrode surfaces for the fuel cell 160 to produce a stable output.

Furthermore, depending on the load on the fuel cell 160, the interval of time at which the supply and discharge of the reactant gases is switched may be changed, or the numbers of gas supply ports and gas discharge ports that are simultaneously used may be changed. By changing the above interval of time and the numbers of gas supply ports and gas discharge ports that are simultaneously used depending on the load on the fuel cell 160, it is possible to maintain an optimum distribution of reactant gases on the electrode surfaces depending on a change in the output of the fuel cell 160, and the fuel cell 160 can produce a stable output immediately after the change in the output of the fuel cell 160.

The first and second separators 26, 28 and the other separators described above have been illustrated as being made of metal. However, they may be made of carbon.

With the fuel cell and the method of operating the fuel cell according to the present invention, the fluids flow in the fluid flow fields along the electrode surfaces, and the flow directions of the fluids are changed continuously.

When the flow direction of the fluid is changed, the flow of the fluid is not stopped. Therefore, the fuel cell can reliably produce a stable output. It is possible to uniformize the distribution of current densities, the distribution of produced water, the distribution of humidities, and the distribution of temperatures on the electrode surfaces. Thus, the characteristics of the fuel cell to generate electric energy are improved. The power generation is uniformly performed over the entire electrode surfaces, and the entire electrode surfaces are uniformly utilized. Consequently, the durability of the electrolyte electrode assembly is effectively improved.

Although certain preferred embodiments of the present invention have been shown and described in detail, it should be understood that various changes and modifications may be made therein without departing from the scope of the appended claims.

What is claimed is:

1. A fuel cell including an electrolyte electrode assembly, and a pair of separators for sandwiching said electrolyte electrode assembly, said electrolyte electrode assembly including a pair of electrodes and an electrolyte interposed between said electrodes, said fuel cell further comprising:

a plurality of fluid holes extending through said fuel cell for passing a fluid, which comprises at least one of an oxygen-containing gas, a fuel gas, and a coolant, through said fuel cell, wherein the plurality of fluid holes includes at least three fluid holes that are required for passing the fluid;

at least one fluid flow field connectable to said fluid holes for causing said fluid to flow along a surface of said electrode;

a switching mechanism for switching a supply pipe selectively to connect to one of said fluid holes to use as a fluid supply port for supplying said fluid to said fluid flow field or switching a discharge pipe selectively to one of said fluid holes to use as a fluid discharge port for discharging said fluid from said fluid flow field; and a controller that controls the switching mechanism to select a first fluid hole from said fluid holes as the fluid supply port and a second fluid hole from said fluid holes as the fluid discharge port, and to switch the fluid supply port from the first fluid hole or the fluid discharge port from the second fluid hole to a third fluid hole to change the flow direction of said fluid in said fluid flow field, while maintaining continuous flow of said fluid.

2. A fuel cell according to claim 1, wherein each of said fluid holes is used as said fluid supply port, used as said fluid discharge port, or not used as a fluid port by switching operation of said switching mechanism, and at least one fluid hole is used as said fluid supply port and at least one fluid hole is used as said fluid discharge port.

3. A fuel cell according to claim 1, wherein said fluid holes include at least one inner hole defined in said electrodes.

4. A fuel cell according to claim 1, wherein said fluid flow field is defined by an embossed structure on said separator.

5. A fuel cell according to claim 4, wherein said embossed structure includes guide ribs.

6. A fuel cell according to claim 1, wherein said fuel cell includes at least two fluid flow fields, and said fluid flow fields include a fuel gas flow field and an oxygen-containing gas flow field for being supplied with a fuel gas and an oxygen-containing gas, respectively, which flow as counterflows, respectively, through said fuel gas flow field and said oxygen-containing gas flow field.

7. A fuel cell according to claim 6, wherein said fluid flow fields further include a coolant flow field for being supplied with a coolant flowing through said coolant flow field, the coolant flows parallel to said oxygen-containing gas.

8. A fuel cell according to claim 1, wherein said electrolyte electrode assembly and said separators are stacked vertically.

* * * * *